(12) United States Patent
Jackson et al.

(10) Patent No.: US 7,483,964 B1
(45) Date of Patent: Jan. 27, 2009

(54) SYSTEM, DEVICE, AND METHOD FOR PROVIDING PERSONALIZED SERVICES IN A COMMUNICATION SYSTEM

(75) Inventors: Stephen S. Jackson, Chapel Hill, NC (US); Franco Travostino, Arlington, MA (US)

(73) Assignee: Nortel Networks, Limited, St. Laurent, Quebec (CA)

( * ) Notice: Subject to any disclaimer, the term of this patent is extended or adjusted under 35 U.S.C. 154(b) by 1371 days.

(21) Appl. No.: 09/707,280

(22) Filed: Nov. 6, 2000

Related U.S. Application Data

(60) Provisional application No. 60/184,885, filed on Feb. 25, 2000.

(51) Int. Cl.
*G06F 15/177* (2006.01)
*G06F 15/16* (2006.01)
*H04B 5/00* (2006.01)
*H04B 7/00* (2006.01)

(52) U.S. Cl. .................... 709/221; 709/202; 709/226; 709/227; 713/100; 455/41.1; 455/41.2

(58) Field of Classification Search ......... 709/201–203, 709/204, 205, 224–229; 713/100; 455/41.1, 455/41.2
See application file for complete search history.

(56) References Cited

U.S. PATENT DOCUMENTS

| | | | | |
|---|---|---|---|---|
| 5,493,692 A | * | 2/1996 | Theimer et al. | 709/225 |
| 5,741,616 A | * | 4/1998 | Hirano et al. | 430/101 |
| 5,850,753 A | * | 12/1998 | Varma | 702/278.7 |
| 5,872,834 A | * | 2/1999 | Teitelbaum | 379/93.03 |
| 5,977,964 A | * | 11/1999 | Williams et al. | 715/721 |
| 6,104,913 A | * | 8/2000 | McAllister | 455/41.1 |
| 6,104,922 A | * | 8/2000 | Baumann | 455/410 |
| 6,256,019 B1 | * | 7/2001 | Allport | 345/169 |
| 6,331,972 B1 | * | 12/2001 | Harris et al. | 370/313 |
| 6,487,180 B1 | * | 11/2002 | Borgstahl et al. | 370/310 |

OTHER PUBLICATIONS

Zimmerman, T., "Personal Area Networks: Near-Field intrabody communication", 1996, IBM Systems journal, vol. 35, Nos. 3&4.*

* cited by examiner

*Primary Examiner*—David Lazaro
(74) *Attorney, Agent, or Firm*—David A. Dagg

(57) ABSTRACT

A system, device, and method for providing personalized services in a communication system detects physical presence of a user and provides personalized services to the user based upon the physical presence of the user. The user is typically identified to some degree, and user-specific information is obtained based upon the identity of the user. The user-specific information is used to provide the personalized services to the user.

66 Claims, 18 Drawing Sheets

SYSTEM, DEVICE, AND METHOD FOR PROVIDING PERSONALIZED SERVICES IN A COMMUNICATION SYSTEM

PRIORITY

This patent application claims priority from the U.S. Provisional Patent Application No. 60/184,885 entitled METHOD AND APPARATUS FOR CONFIGURING A DEVICE, which was filed on Feb. 25, 2000 in the names of Stephen S. Jackson and Franco Travostino, and is hereby incorporated herein by reference in its entirety.

CROSS-REFERENCE TO RELATED APPLICATION(S)

This patent application may be related to the following commonly-owned United States Patent Applications, which are hereby incorporated herein by reference in their entireties:

U.S. patent application Ser. No. 09/326,733 entitled MODULAR COMPUTER SYSTEM, which was filed on Jun. 4, 1999 in the names of Bradley Cain, William Miller, Robert Lee, Larry DiBurro, and Michael Berger;

U.S. patent application Ser. No. 09/707,281 entitled METHOD AND APPARATUS FOR BRIDGING INCOMPATIBLE COMPUTER BUSES, filed on even date herewith in the name of Ottis K. Black; and U.S. patent application Ser. No. 09/707,082 entitled SYSTEM, DEVICE, AND METHOD FOR CONFIGURING A DEVICE, filed on even date herewith in the names of Stephen S. Jackson and Franco Travostino.

FIELD OF THE INVENTION

The present invention relates generally to communication systems, and more particularly to providing personalized services to a user in a communication system.

BACKGROUND OF THE INVENTION

In today's information age, an ever-increasing number of devices are being interconnected over communication networks. While most networked devices have traditionally been general-purpose computers and related peripherals, more and more networked devices are special-purpose devices. It is getting to the point where just about anything can and is being coupled to communication networks. For convenience, a device (other than a computer or workstation) that is capable of being coupled to a communication network and consuming network services is referred to hereinafter as a data appliance (DA).

The sheer ubiquity of these newer DAs will make them more accessible and more idealized for specific purposes than general-purpose computers. Thus, these newer DAs can be expected to attract a higher degree of usage, and by a larger portion of the general population. These factors combine to place additional strains on communication networks, which will be hard pressed to provide sufficient bandwidth and services to the DAs as the number of DAs increases. Deficiencies in existing communication networks include insufficient wiring for coupling the DAs to the communication networks, too few router and LAN ports for supporting the DAs, and insufficient address space.

Traditional solutions to such deficiencies include such things as installing additional wiring for coupling the DAs to the communication networks, layer 2 bridging to reduce the number of router and LAN ports for supporting the DAs, and layer 3 switching to use fewer layer 3 addresses. The shared access mechanisms, such as layer 2 bridging and layer 3 switching, have certain limitations, including providing the bridged/switched DAs with unequal access to the communication network compared to other DAs, preventing the DAs from being logically separated (e.g., for layer 2 or layer 3 VLANs), requiring that the DAs use the same protocol and reside in the same subnet, and causing various management and security problems. Furthermore, installing additional wiring for coupling the DAs to the communication networks, layer 2 bridging to reduce the number of router and LAN ports for supporting the DAs, and layer 3 switching to use fewer layer 3 addresses become prohibitive as the number of DAs increases.

SUMMARY OF THE INVENTION

In accordance with one aspect of the invention, personalized services are provided to a user based upon the physical presence of the user. Specifically, physical presence of the user is detected, and personalized services are provided to the user based upon the physical presence of the user.

In accordance with another aspect of the invention, personalized services are provided to a user based upon the identity of the user. Specifically, the user is identified to some degree, and personalized services are provided to the user based upon the identity of the user. Typically, user-specific information is obtained based upon the identity of the user, and the personalized services are provided to the user based upon the user-specific information.

In accordance with yet another aspect of the invention, personalized services are provided to a user within the context of a personal area network. Specifically, the user is identified to some degree, a personal area network is established for the user, and personalized services are provided to the user within the personal area network.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

In an embodiment of the present invention, a number of co-located devices (such as computers, workstations, DAs, and other devices) are managed and controlled by a controller device that is referred to hereinafter as a data appliance gateway (DAG). The DAG is essentially a gateway that is situated between the various devices and the communication network. Among other things, the DAG provides for configuration and control of the various devices, enables direct communication among and between the various devices, and controls communications by the supported devices over the communication network. Thus, the DAG and its supported devices form a small network segment that is separated from the rest of the communication network by the DAG.

Figure 1:
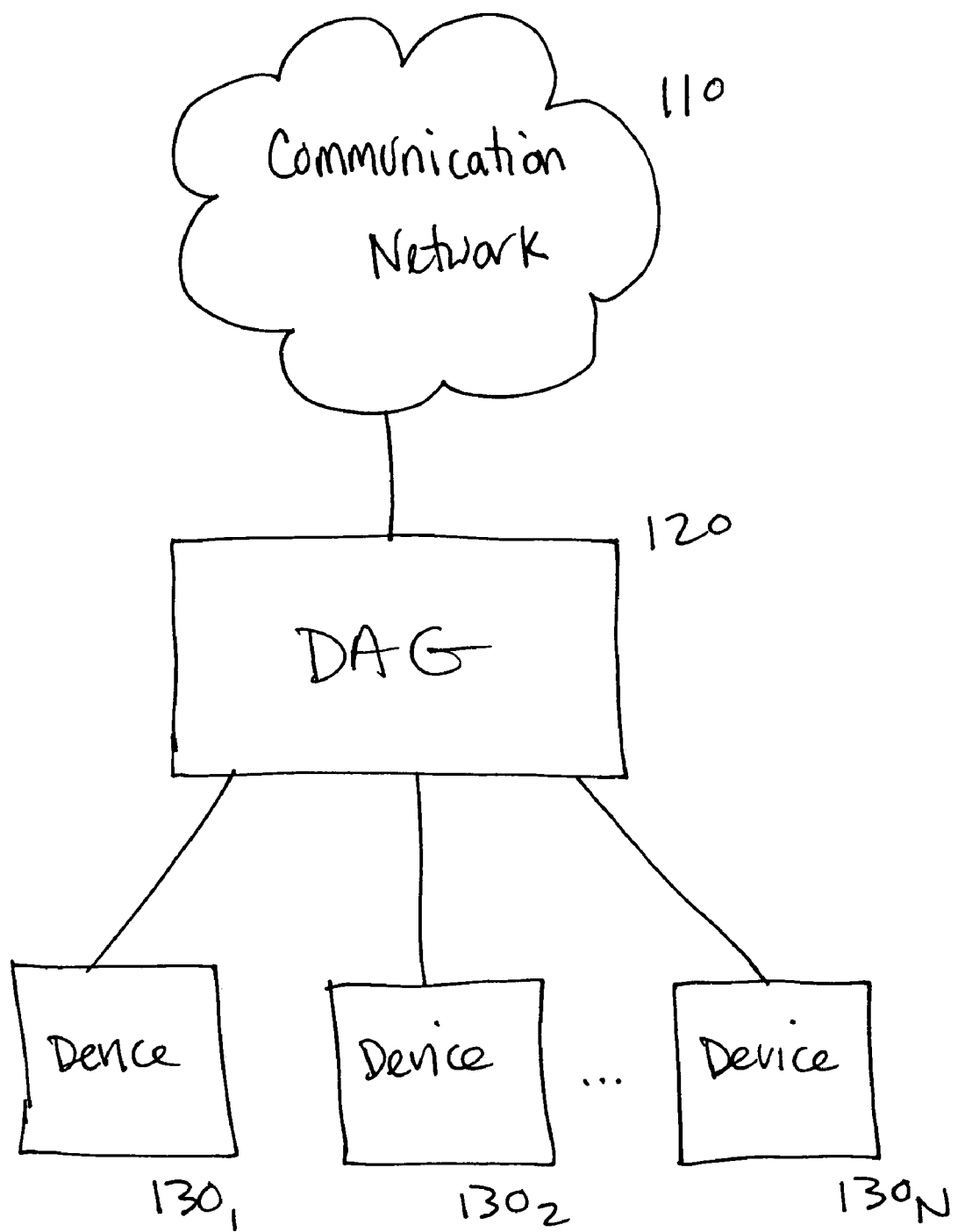
FIG. 1 shows an exemplary communication system in which a DAG is used to interface a number of devices to a communication network in accordance with an embodiment of the present invention.

FIG. 1 shows an exemplary communication system 100 in which a DAG 120 is used to interface a number of devices 1301-130N (referred to individually as a device 130 and collectively as devices 130) to a communication network 110. Among other things, the DAG 120 provides for configuration and control of the devices 130, enables direct communication among and between the devices 130, and controls communications by the devices 130 over the communication network 110. Because the DAG 120 is coupled to the communication network 110 and consumes network services, the DAG 120 is itself a data appliance (DA).

The DAG 120 is typically implemented on a level 3 (network layer) routing device, and includes a layer 4 (application layer) gateway and a plurality of device interfaces for communicating with the supported devices 130. Bandwidth for each device interface is intelligently allocated based upon the devices 130 connected to the DAG 120. The DAG 120 is typically configured similarly to that disclosed in the related application Ser. No. 09/326,733, entitled MODULAR COMPUTER SYSTEM, which was incorporated by reference above.

Figure 2:
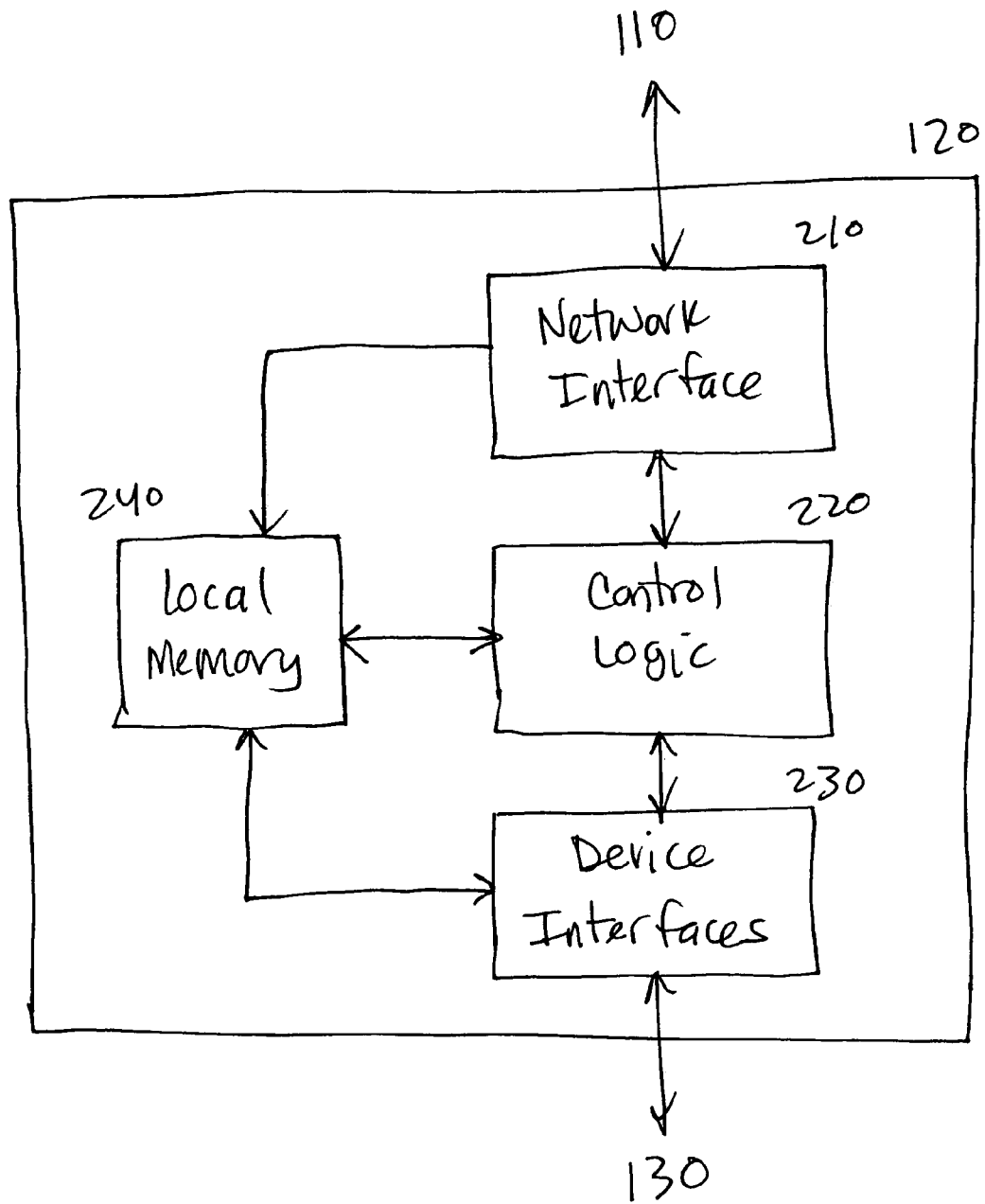
FIG. 2 is a conceptual block diagram showing the relevant logic blocks of an exemplary DAG in accordance with an embodiment of the present invention.

FIG. 2 is a conceptual block diagram showing the relevant logic blocks of an exemplary DAG 120. Among other things, the DAG 120 includes a network interface 210, control logic 220, a number of device interfaces 230, and local memory 240. The control logic 220 is coupled to the network interface 210 for communicating over the communication network 110. The control logic 220 is coupled to the device interfaces 230 for communicating with the supported devices 130. The network interface 210, control logic 220, and the device interfaces 230 are coupled to the local memory 240. The local memory 240 may include such things as a Random Access Memory (RAM), a Read-Only Memory (ROM), a FLASH memory, and a hard disk, to name but a few.

The DAG 120 is coupled to the communication network 110 via the network interface 210. The network interface 210 may support any of a number of communication technologies for interfacing with the communication network 110, such as modem, DSL, ISDN, T1/E1, Ethernet, Token Ring, and SONET, to name but a few. The DAG 120 supports various protocols for communicating over the communication network 110 via the network interface 210.

The DAG 120 is coupled to the devices 130 via the device interfaces 230. The device interfaces 230 may support any of a number of communication technologies for interfacing with the supported devices 130, such as Ethernet, USB (Universal Serial Bus), Firewire, PCMCIA, PCI, $I^2C$, serial port (e.g., RS-232), parallel port, wireless LAN, wireless RF, wireless infrared, and home wiring (e.g., X-10), to name but a few. The DAG 120 supports various communication protocols and signaling mechanisms for communicating with the supported devices 130 over the device interfaces 230. A supported device 130 may be coupled directly to a device interface 230 or may be coupled to the device interface 230 via some type of intermediate device (not shown).

The control logic 220 operates at various levels in order to provide for configuration and control of the various devices 130, enable direct communication among and between the various devices 130, and control communications by the devices 130 over the communication network 110. Specifically, with reference to a protocol stack, the control logic 220 operates at the physical layer, link/MAC layer, network layer, and higher layers in order to provide for configuration and control of the various devices 130, enable direct communication among and between the various devices 130, and control communications by the devices 130 over the communication network 110.

At the physical layer, the control logic 220 may provide connection control functions as well as repeater functions. For example, the control logic 220 may establish, monitor, and terminate physical connections for the supported devices 130 over the device interfaces 230. The control logic 220 may also act as a repeater for coupling device interfaces 230 at the physical layer.

At the link/MAC layer, the control logic 220 may provide bridging functions in order to bridge device interfaces 230. For example, the control logic 220 may bridge multiple Ethernet device interfaces.

At the network layer, the control logic 220 may perform routing and forwarding of information according to a network layer protocol such as the Internet Protocol. For example, the control logic 220 may route information locally between supported devices 130 in order to reduce the amount of traffic over the network interface 210. The control logic 220 may also route information between the supported devices 130 and the communication network 110.

At the higher layers, the control logic 220 acts as a gateway between the supported devices 130 and the communication network 110. Specifically, the control logic 220 represents the network access point for the supported devices 130 to access the communication network 110. The control logic 220 may perform access control functions, such as authentication and encryption, on behalf of the supported devices 130. The control logic 220 may act as a firewall in order to prevent unauthorized access to the supported devices 130 from the communication network 110.

Also at the higher layers, the control logic 220 may provide an almost unlimited number of application functions. Among other things, the control logic 220 may provide device management services, data acquisition/distribution services, communication interface services, filtering services, and database services for the supported devices 130. The control logic 220 may also provide a variety of services to the end users of the supported devices 130.

Device management services provide configuration, monitoring, and control of the supported devices 130. Device management services may include, among other things, identifying the supported devices 130, determining the management capabilities of the supported devices 130, managing the supported devices 130, and enabling remote management of the supported devices 130. Identifying the supported devices 130 may involve such things as sending poll messages over the device interfaces 230 and trying different protocol and signaling combinations in order to establish communication with an unknown device 130. Determining the management capabilities of the supported devices 130 may involve such things as determining a device address for a device 130, determining communication protocols supported by the device 130, determining the configurable/controllable features of the device 130, determining a configuration map for the device 130, and supporting a Management Information Base (MIB) for the device 130. Managing the supported devices 130 may involve such things as determining operating parameters for each supported device 130 and generating management commands for configuring and controlling the supported devices 130. Enabling remote management of the supported devices 130 may involve such things as supporting a management agent (such as a SNMP proxy agent) and converting between different management protocols.

Data acquisition/distribution services may include, among other things, obtaining information from the communication network 110 and sending the information to the supported devices 130. Obtaining the information from the communication network 110 may involve such things as actively retrieving the information from the communication network 110 and joining a multicast group for receiving the information from the communication network 110. Sending the information to the supported devices 130 may involve such things as sending unicast messages to the supported devices 130 and setting up a multicast distribution tree for sending the information to the supported devices 130.

Communication interface services enable and facilitate communication between the supported devices 130 and/or the communication network 110. Communication interface services may include, among other things, connection control services, protocol conversion services, address management services, and proxy services for enabling communication between supported devices 130. Connection control services may involve such things as managing connections between supported devices 130 and managing connections between supported devices 130 and the communication network 110. Protocol conversion services may involve such things as converting message formats, encapsulating messages, and performing the appropriate signaling on each device interface 230. Address management services may involve such things as allocating addresses, resolving addresses, and performing address translation. Proxy services may involve such things as implementing protocols on behalf of supported devices 130 and communicating on behalf of supported devices 130.

Filtering services provide monitoring and control of communications between the supported devices 130 and/or the communication network 110. Filtering services may include, among other things, monitoring communications between the supported devices 130 and/or the communication network 110 and preventing unauthorized accesses to the supported devices 130 and/or the communication network 110 by the supported devices 130.

Database services may include, among other things, storing configuration and other information for the supported devices 130. For example, the control logic 220 may act as a central server or clipboard for distributing and sharing information among the supported devices 130.

The control logic 220 may provide a wide range of end-user services. End-user services may include, among other things, user management of the supported devices 130, enforcement of per-user rules (e.g., rules set by the network administrator), enforcement of user-defined rules (e.g., parental control rules), application of user preferences, time management (e.g., appointment reminders), and time-of-day/day-of-week control of the supported devices 130.

Because the DAG 120 acts as a central controller for its supported devices 130, it is important for the DAG 120 to remain operational. Therefore, the DAG 120 typically includes various mechanisms to ensure continued operation. For example, the DAG 120 is typically self-configuring, using information that is stored locally and/or information that is retrieved from the communication network 110 to configure itself for operating in a particular environment with a particular set of devices 130 (e.g., installing appropriate device drivers and application program interfaces for the supported devices 130). Also, the DAG 120 is typically software upgradable, with software upgrades obtained over the communication network 110 and stored in the local memory 240 (e.g., local hard drive or FLASH memory). Additionally, the DAG 120 may include multiple power sources, such as a primary plug-in power source (e.g., 120 VAC with internal or external DC conversion) and an alternate power source (e.g., battery backup or powered Ethernet 802.3af. The DAG 120 may provide power to one or more of its supported devices 130 via the device interfaces 230.

In an exemplary embodiment of the present invention, the DAG 120 includes logic for establishing a user-specific environment for a particular user. This is particularly useful for a space that is available to multiple users in order to automatically, dynamically, and transparently customize the space (and the devices in the space) for the user. For convenience, the user-specific environment that is created by the DAG 120 for the user is referred to hereinafter as a personal area network (PAN).

Figure 3:
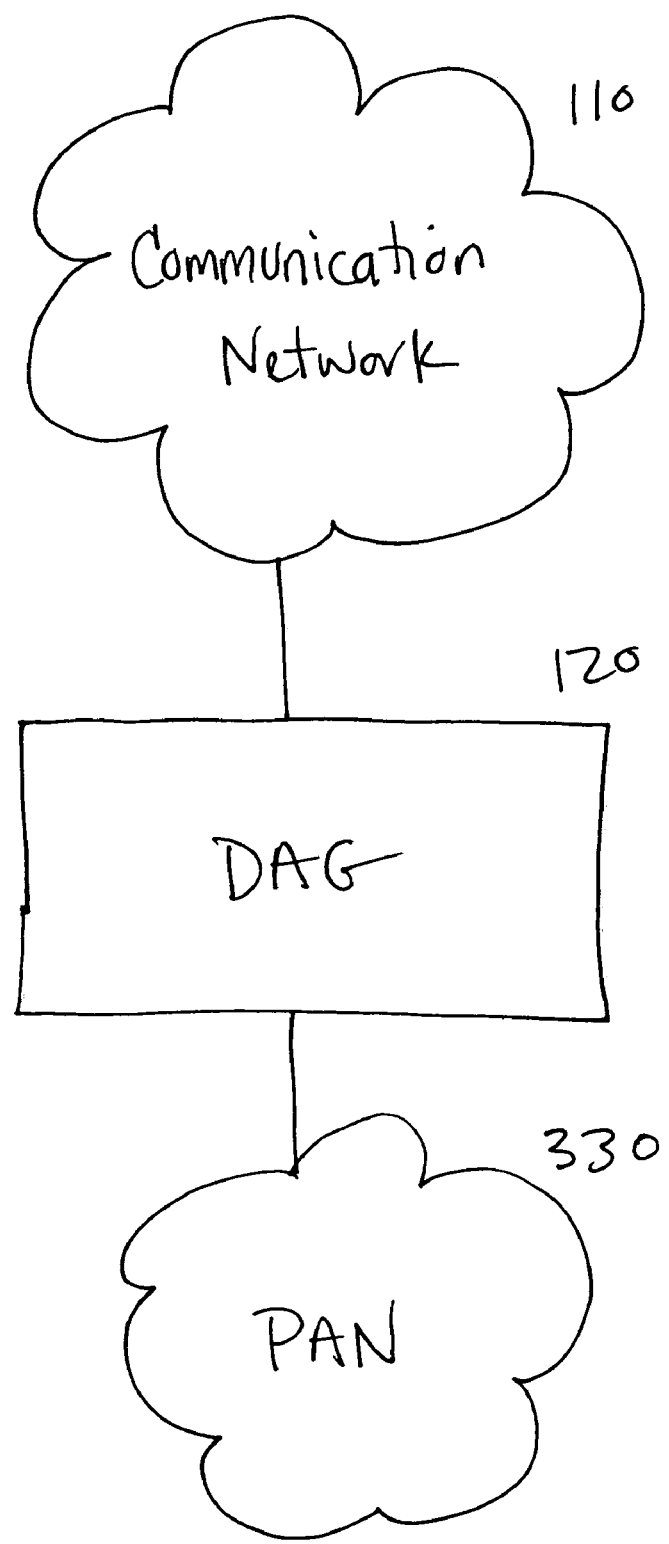
FIG. 3 shows an exemplary communication system in which the DAG is used to establish a PAN in accordance with an embodiment of the present invention.

FIG. 3 shows an exemplary communication system 300 in which the DAG 120 is used to establish a PAN 330. The DAG 120 operates in both the communication network 110 and the PAN 330, and therefore the DAG 120 may be considered part of both the communication network 110 and the PAN 330. The PAN 330 typically includes a number of devices 130 in addition to the DAG 120 itself.

The PAN 330 represents a virtual environment that has various advertised or potential attributes. However, the actual attributes of the PAN 330 only come into fruition when the DAG 120 detects the physical presence of the user. Specifically, the PAN 330 is customized for the user such that, at least to some degree, the DAG 120 and the supported device(s) in the PAN 330 are configured specifically for the user. In essence, then, the PAN 330 extends the network down to the individual user. Thus, the PAN 330 is generally narrower in scope than, for example, a wide area network (WAN), a metropolitan area network (MAN), or a local area network (LAN).

The PAN 330 can be established in a variety of contexts, and can cover a wide range of physical spaces. Examples include, among other things, a building, an area of a building (e.g., room, foyer, lobby, bathroom, elevator, restaurant table/booth, airport lounge), a hotel room, an office/cubicle, a timeshare condominium, a rental apartment, a retail store, a vehicle (e.g., automobile, rental car, taxi, limousine), an individual seat in a vehicle (e.g., automobile, taxi, limousine, bus, train, airplane, boat), a public area (e.g., park, rest stop, playground), and a public utility (e.g., pay phone, automatic teller machine, internet access terminal), to name but a few. A separate DAG 120 may be used to manage each PAN space, or a single DAG 120 may support multiple PAN spaces.

Thus, within the DAG 120, the control logic 220 includes logic for establishing and maintaining the PAN 330. The control logic 220 automatically, dynamically, and transparently configures the DAG 120 and various devices 130 for the user in order to form the PAN 330.

In order to create the PAN 330, the control logic 220 must first detect the presence of the user and identify the user to some degree. Thus, the DAG 120 includes a mechanism for detecting and identifying the user. The mechanism for detecting and identifying the user can utilize any user detection/identification techniques including, but in no way limited to, various biometric, behavioral, and interactive techniques. Examples include, among other things, physical presence detection (e.g., body heat detection, motion detection, proximity detection via such things as radar, sonar, and changes in electric field), a personal identification number entered through a key pad, an access card swiped through a card reader, voice recognition, fingerprint identification, retinal scanning, DNA analysis, visual identification, handwriting analysis, and physical characteristics (e.g., height, weight, infrared signature, electromagnetic signature), among other things. Thus, the DAG 120 may include or be coupled to a physical presence detector, a detector for detecting the user, such as a keypad for obtaining a personal identification number, a card reader for reading an access card, a voice recognizer for voice recognition, a fingerprint reader for fingerprint identification, a retinal scanner for retinal scanning, a DNA analyzer for DNA analysis, a camera for visual identification, a handwriting reader for handwriting analysis, a scale for measuring weight, an infrared sensor for reading an infrared signature, an electromagnetic sensor for reading an electromagnetic signature, or other detector. The detector may be integral with or external to the DAG 120. External detectors may be intelligent devices that include logic for identifying users or unintelligent devices that feed raw information to the control logic 220 for enabling the control logic 220 to identify the users.

Figure 4:
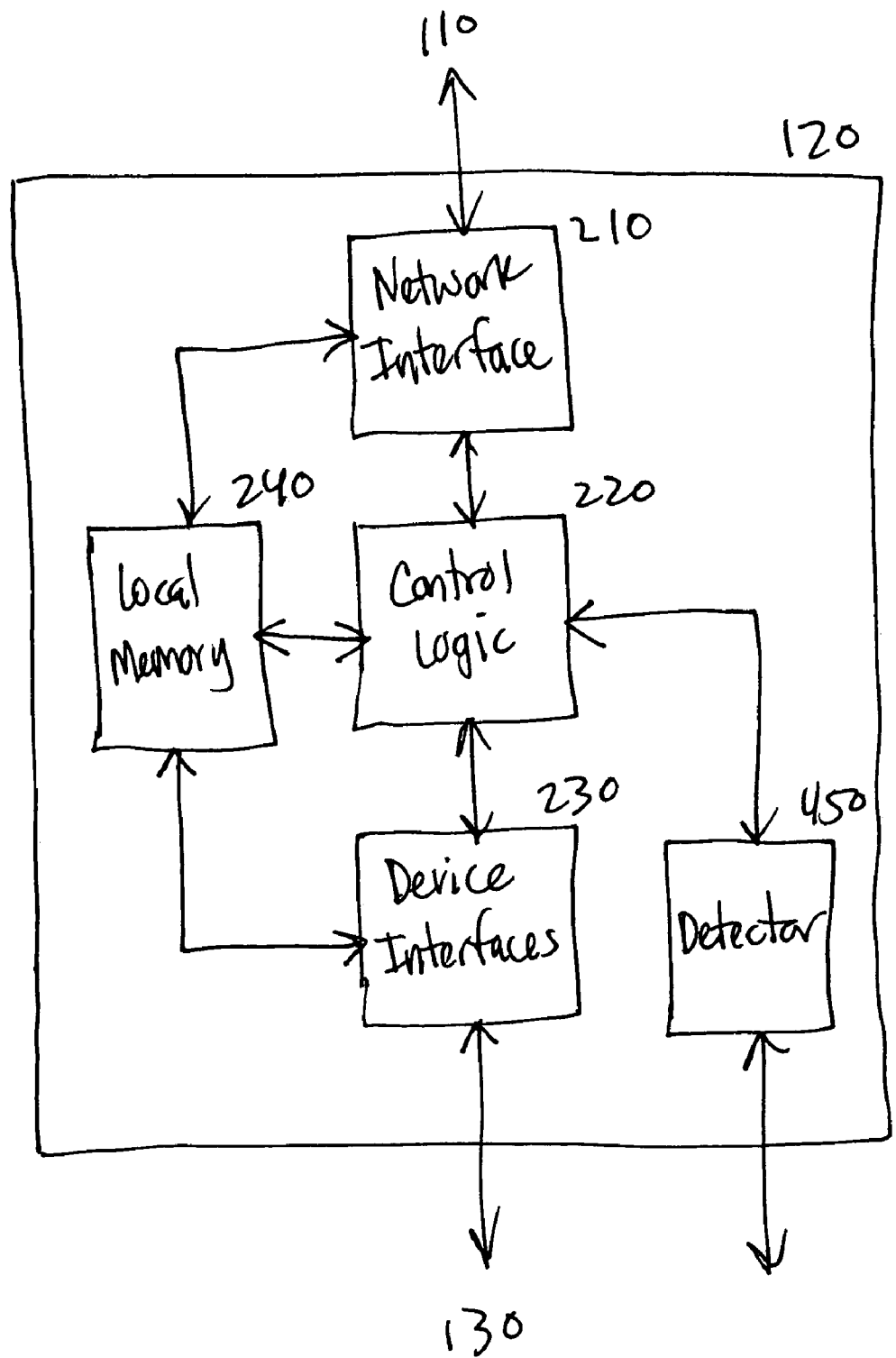
FIG. 4 shows an exemplary DAG including an integral detector for detecting the physical presence of a user in accordance with an embodiment of the present invention.

FIG. 4 shows an exemplary DAG 120 including an integral detector 450 for detecting the physical presence of a user. The detector 450 feeds user-identifying information to the control logic 220. The control logic 220 uses the user-identifying information to identify the user to some degree.

Figure 5:
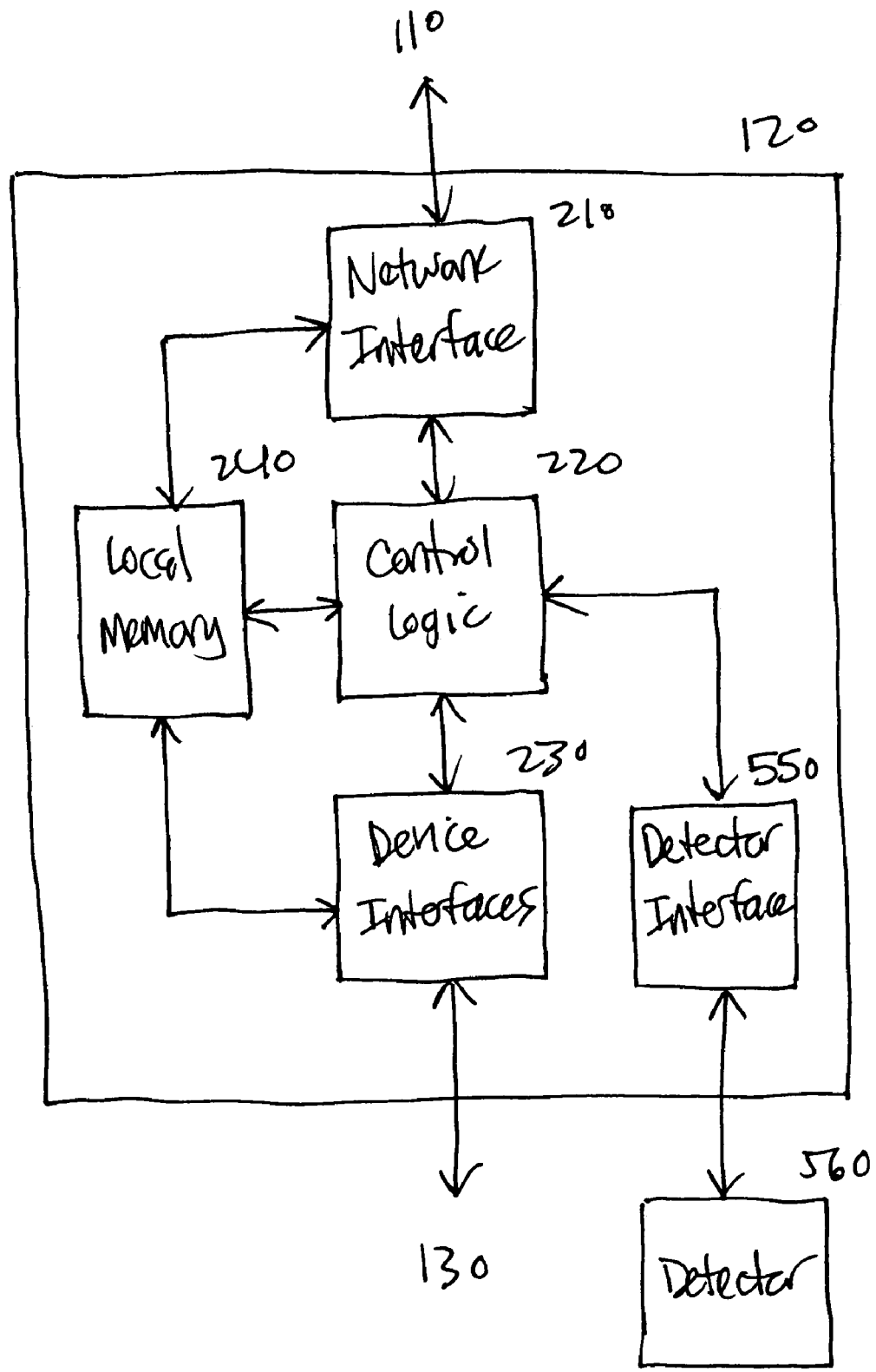
FIG. 5 shows an exemplary DAG coupled to an external detector for detecting the physical presence of a user in accordance with an embodiment of the present invention.

FIG. 5 shows an exemplary DAG 120 coupled to an external detector 560 for detecting the physical presence of a user. The DAG 120 includes a detector interface 550 for coupling to the detector 560. The detector 560 feeds user-identifying information to the control logic 220 via the detector interface 550. The control logic 220 uses the user-identifying information to identify the user to some degree.

In order to create the PAN 330, the control logic 220 must also identify devices that are within a "personal area" of the user. The control logic 220 may determine the personal area of the user statically (i.e., a fixed set of devices) or dynamically (i.e., a variable set of devices). The control logic 220 may identify the devices in the personal area of the user prior to or after identifying and locating the user. The user may carry certain devices (e.g., laptop computer, personal digital assistant, cell phone, pager, cordless phone, hand-held appliance) that become part of the PAN (e.g., when the user plugs the device into an electrical outlet or communication connector or when communication is established with the device through wireless or other communication technology).

The control logic 220 also determines the management capabilities of the various devices. The control logic 220 may maintain device management information in the local memory 240, may obtain device management information from a remote source (e.g., over the communication network 110), or may obtain device management information directly from the device. The control logic 220 may infer device management capabilities for an unknown device, for example, from device management information relating to other similar devices.

Once the control logic 220 has identified the user and determined the devices in the PAN 330, the control logic 220 obtains various types of information for configuring the DAG 120 and/or the supported device(s) 130 in the PAN 330. The various types of information may include such things as per-user rules (i.e., rules set by the network administrator, such as access control rules, quality/type of service constraints, and bandwidth allocation), user-defined rules (e.g., rules set by one or more of the users, such as parental control rules), user preferences, user-specific applications, and device configuration profiles. The various types of information may be stored locally in the DAG 120 (e.g., in the local memory 240), in any of the supported devices 130, and/or within the communication network 110. Thus, the control logic 220 may retrieve the information from a local storage (e.g., local memory 240) and/or a remote storage (e.g., in a device 130 or the communication network 110) in order to create the PAN 330.

Once the control logic 220 has retrieved the various types of information, the control logic 220 configures the DAG 120 and/or the supported device(s) 130 in the PAN 330 using the retrieved information. Among other things, the control logic 220 may configure the DAG 120 and/or the supported device (s) 130 in the PAN 330 based upon per-user rules, user-defined rules, user preferences, and user-specific applications, to name but a few. This is typically done automatically, dynamically, and transparently to the user.

Per-user rules may include such things as subscription services (e.g., cable television channels), quality/type of service constraints, bandwidth allocation, network access control mechanisms (e.g., authentication and security mechanisms), and physical access control mechanisms (e.g., physically lock or unlock a device 130) imposed by the network administrator, to name but a few.

User-defined rules may include various parental control rules for controlling access to such things as television channels, web sites, chat rooms, email, household appliances (e.g., stove, microwave oven, toaster), and physical spaces (e.g., rooms, cabinets, desk drawers, file cabinets), to name but a few.

User preferences may include various device-specific and device-independent preferences. Many exemplary user preferences are disclosed herein.

User-specific applications may include such things as preferred word processor, preferred spreadsheet application, preferred operating system, and preferred web browser, to name but a few. User-specific applications may also include such things as user interface applications (e.g., after identifying the user based upon a password, the control logic 220 may retrieve and install user-specific voice recognition software so that the user can subsequently control devices 130 using voice commands), user macros, and user-provided applications (e.g., email filters, custom software, plug-ins, applets), to name but a few.

Among other things, the control logic 220 typically configures the supported device(s) 130 in the PAN 330 based upon user preferences. If no user preferences are available for a particular device 130, then the control logic 220 may configure the device 130 to a default configuration, or may logically infer a configuration for the device 130 based upon preference information for other devices.

Various aspects of the present invention can be demonstrated by example with reference to personal area networking in a home environment. For purposes of discussion, the home can be considered a shared environment, with different people occupying different rooms at different times. An occupant can be alone in a room or can share a room with one or more other occupants. In a home environment, then, a DAG 120 can be used to create PANs for the various occupants.

The home typically includes one DAG 120 that is capable of establishing PANs of varying scopes, such as floor-by floor, room-by-room, or even within a room. In order to establish such PANs, each room or area of the home typically includes a detector for detecting the presence of a user. User identification information is fed from the detectors to the DAG 120, which uses the user identification information to identify and locate the users within the home.

After identifying and locating a particular user within the home, the DAG 120 typically determines which devices are within a "personal area" of the user. The DAG 120 may identify the devices in the personal area of the user prior to or after identifying and locating the user. The DAG 120 may determine the personal area of the user statically (e.g., by maintaining pre-configured personal area zones throughout the home, such as on a room-by-room basis) and/or dynamically (e.g., by selecting devices within a predetermined distance from the user).

Also after identifying and locating the user within the home, the DAG 120 may obtain various types of information for establishing the PAN for the user. The information may include such things as per-user rules, user-defined rules, user preferences, and device configuration profiles, to name but a few. The DAG 120 may retrieve the information from local storage and/or from remote sources. The DAG 120 configures itself and/or various devices based upon the retrieved information.

Within the home environment, there are many different types of controllable devices, with more being created all the time as technology advances. Even many traditional household objects and appliances will be controllable in the future. Exemplary controllable devices in the home may include such things as computers and internet appliances, phone systems, video systems, audio systems, security systems, lighting systems, HVAC (heating, ventilation, and air conditioning) systems, appliances, food/beverage dispensers, programmable fixtures, programmable exercise equipment, and even programmable artwork, to name but a few. The DAG 120 can configure and control these and other devices in the home environment in order to create a PAN for the user.

For computers and internet appliances, controllable features may include such things as the desktop, applications, application preferences, documents, browser preferences (e.g., bookmarks and history), email messages, and email preferences, to name but a few. Each user typically has his or her own preferences for such things. The DAG 120 may configure various features based upon user preferences in order to customize the computer or internet appliance for the user. Thus, for example, the DAG 120 may replicate the user's computing environment in each PAN so that each computer and internet appliance has a similar "look and feel" when used by that user.

For phone systems, controllable features may include such things as volume controls (e.g., ring volume and receiver volume), speed dial buttons, and voice mail preferences. Each user typically has his or her own preferences for such things. The DAG 120 may configure various features based upon user preferences in order to customize the phone system for the user. The DAG 120 may move an ongoing phone call from one phone to another phone (e.g., from a cell phone to a POTS phone or from one phone line to another phone line). The DAG 120 may map a user's telephone number or extension to a phone in the PAN so that the telephone number or extension becomes portable. The DAG 120 may move voice mail messages from one phone to another phone.

For video systems, controllable features may include such things as favorite channels, favorite shows, and various per-user restrictions (e.g., channels, shows, show ratings), to name but a few. Each user typically has his or her own preferences for such things. The DAG 120 may configure various features based upon user preferences in order to customize the video system for the user.

For audio systems, controllable features may include such things as favorite radio stations, favorite music genre, and favorite songs/artists, to name but a few. Each user typically has his or her own preferences for such things. The DAG 120 may configure various features based upon user preferences in order to customize the audio system for the user.

For security systems, controllable features may include such things as programmable alarm zones, intelligent detectors (e.g., motion, heat, smoke, glass breakage), and programmable door locks, to name but a few. The DAG 120 may configure various features in order to customize the alarm system based upon the user. For example, the DAG 120 may automatically bypass an alarm zone or detector when the user is present or prevent a particular user from entering a particular room by locking the door lock.

For lighting systems, controllable features may include such things as turning the lights on when the user enters the room, adjusting the lights based upon user preferences, and shutting off the lights when the user leaves the room. The DAG 120 may configure various features based upon user preferences in order to customize the lighting system for the user.

For HVAC (heating, ventilation, and air conditioning) systems, controllable features may include such things as temperature, ventilation, air conditioning, and humidity, to name but a few. Each user typically has his or her own preferences for such things. The DAG 120 may configure various features based upon user preferences in order to customize the HVAC system for the user.

For appliances, controllable features may include such things as toaster settings (e.g., light or dark toast), coffee maker settings (e.g., type of coffee, brew strength, amount), refrigerator settings (e.g., crushed or cubed ice), and alarm clock settings (e.g., a different wake-up time for each user, and an appropriate alert in whichever room the user is sleeping), to name but a few. Each user typically has his or her own preferences for such things. The DAG 120 may configure various features based upon user preferences in order to customize the appliances for the user.

For food/beverage dispensers, controllable features may include such things as preferred soft drink, preferred liquor or mixed drink, preferred beer, and preferred snack food, to name but a few. Each user typically has his or her own preferences for such things. The DAG 120 may configure various features based upon user preferences in order to customize the food/drink dispenser for the user. For example, the DAG 120 may configure the food/beverage dispenser so that, when the user asks for a beer and a snack, the food/beverage dispenser dispenses the user's preferred beer and snack.

For programmable fixtures, controllable features may include such things as programmable water temperature (e.g., for hand washing, bath, shower, bidet), showerhead settings, whirlpool settings, and toilet settings (e.g., seat temperature), to name but a few. Each user typically has his or her own preferences for such things. The DAG 120 may configure various features based upon user preferences in order to customize programmable fixtures for the user.

For programmable exercise equipment, programmable features may include such things as the amount of resistance (e.g., for a weightlifting machine, exercise bike, elliptical trainer, stair climber, or rowing machine), pedaling/walking speed (e.g., for a treadmill or exercise bike), incline (e.g., for a weightlifting machine, treadmill, bike, or elliptical trainer), and exercise program, to name but a few. Each user typically has his or her own preferences for such things. The DAG 120 may configure various features based upon user preferences in order to customize programmable exercise equipment for the user.

For programmable artwork, programmable features may include such things as pictures displayed on flat panel screens, programmable color schemes, and adjustable sculptures, to name but a few. Each user typically has his or her own preferences for such things. The DAG 120 may configure various features based upon user preferences in order to customize the artwork for the user. For example, the DAG 120 may display classical artwork for one user and contemporary artwork for another user.

Similarly, a DAG 120 can be used to configure and control various devices in a hotel environment in order to create a PAN for the user. In a hotel environment, there is typically one DAG 120 for each hotel room. In a single occupancy (e.g., as would be typical for a business traveler), there is typically only one user of the hotel room at any given time, although the user changes over time (e.g., from day to day). In this type of application, the PAN is typically more static than, say, the PAN for the home environment as described above. This is because the PAN can typically be created when the user checks into the hotel room, the PAN applies to the entire hotel room, and the PAN remains substantially the same until the user checks out of the hotel room. In a shared hotel room, on the other hand, the DAG 120 would typically behave more as described with reference to the home environment as described above. In any case, upon detecting a particular user, the DAG 120 establishes a PAN for the user by configuring such things as the phone (e.g., one touch dial settings), television, clock radio, and bed (e.g., firmness of air mattress, temperature of water mattress), to name but a few.

Similarly, a DAG 120 can be used to configure and control various devices in a work environment in order to create a PAN for the user. In a work environment, there are typically many different types of shared areas, such as offices, conference rooms, and laboratories, to name but a few. Upon detecting a particular user, the DAG 120 establishes a PAN for the user by configuring such things as computers, workstations, audio/video equipment, office equipment, and laboratory equipment, to name but a few.

Similarly, a DAG 120 can be used to configure and control various devices in a shared vehicle in order to create a PAN for the user. For example, a DAG 120 can be used to create a PAN in an automobile that is available to multiple users (e.g., such as a rental car or a car that is shared by family members). Upon identifying a particular user, the DAG 120 establishes a PAN for the user by configuring such things as seat position, heated seat settings, steering wheel position, mirror positions, climate control settings, radio station settings, audio system settings (e.g., equalizer settings, balance, fade), and even performance parameters (e.g., sport/luxury suspension settings, automatic/shift transmission settings, transmission shift points, engine controls, maximum speed), to name but a few.

Similarly, a DAG 120 can be used to configure and control various devices at individual seats of a vehicle in order to create a PAN for the user. For example, a DAG 120 can be used to create PANs on a seat-by-seat basis in an automobile, taxi, limousine, bus, airplane, or train, to name but a few. Upon identifying a particular user at a particular seat, the DAG 120 establishes a PAN for the user by configuring such things as the user's personal laptop computer, an in-vehicle workstation, and personalized advertising, to name but a few.

Various aspects of the present invention are also demonstrated with reference to various embodiments described in the priority application, which was incorporated above by reference in its entirety. One particular embodiment, referred to as the "Bay-A-Phone," applies various aspects of the present invention to provide various personalized IP-based telephony services.

After establishing the PAN 330 for a particular user, the control logic 220 may dynamically modify the PAN 330. For example, the control logic 220 may dynamically modify the PAN 330 as the user moves around within the PAN 330, as the user moves from space to space, as other users move into and out of a space, and as devices move into and out of a space.

In many environments, a user can move around within a particular space. Moving around within the space may change the user's proximity to various devices. The control logic 220 may track the user and dynamically adjust the PAN 330 as the user moves around within the space. For example, when a user moves around within a room, the control logic 220 may adjust various devices based upon the position of the user within the room. This may involve such things as adjusting the lights, adjusting the volume of a television or stereo (e.g., softer when the user is near the television and louder when the user is across the room from the television), and updating information displayed on a computer screen in anticipation of viewing by the user, to name but a few.

In many environments, users can occupy the same space. The control logic 220 may adjust the scope of each user's PAN 330 based upon the user's proximity to other users. For example, when a user is alone in a room, the control logic 220 may designate the entire room as a PAN 330 for the user, and configure all devices in the room for the user. When another user enters the room, the control logic 220 may split the room into two PANs, one for each user.

Just as users can move from space to space, so too can devices move from space to space. This is particular true of the many types of portable devices. Thus, the devices in a particular PAN 330 may change over time as devices move into and out of the PAN 330. The control logic 220 may track the devices and configure the devices appropriately as they move from space to space. For example, the control logic 220 may configure the one touch dial buttons of a portable phone as the phone is passed from a user in one PAN to a user in another PAN.

In many environments, a user can move from one space to another space. The control logic 220 may track the user and dynamically establish and terminate PANs as the user moves from space to space. For example, when a user moves from the kitchen to the living room, the control logic 220 may terminate a PAN in the kitchen, for example, by shutting off the lights in the kitchen, and establish a PAN in the living room, for example, by turning on the lights in the living room.

Within a particular space, the devices themselves typically have different scopes of control. Some devices may be controllable to a fine degree (e.g., to an individual user level), while other devices may be controllable to a coarser degree (e.g., across multiple PANs). Thus, the control logic 220 may configure a device with a common configuration for multiple PANs, for example, based upon the preferences of multiple users according to a predetermined scheme. For example, climate control settings may apply to a particular space (e.g., entire home, upstairs/downstairs of home, room of home, entire vehicle, front/back of vehicle). If multiple users occupy the space, then the control logic 220 may configure the climate control settings based upon the preferences of the multiple users according to a predetermined scheme. Examples include setting the room temperature to the preference of the first user in the space (i.e., subsequent users are stuck with the temperature preferred by the first user), setting the room temperature to the preference of a particular user, setting the room temperature to the preference of a highest priority user (e.g., parent's preference takes precedence over childrens' preferences), setting the room temperature to the preference of a majority of users (e.g., if more users want the room warm, then make the room warm), and setting the room temperature to the average of all users (e.g., if some users want the room warm and some want it cold, the make the room medium), to name but a few.

In addition to configuring and controlling devices based upon such information as per-user rules, user-defined rules, and user preferences, the DAG 120 can be used to support portable user environments. A portable user environment is one in which certain features follow the user from space to space. In order to create a portable user environment, the control logic 220 may replicate portions of one environment in another environment, copy data from one environment to another, transfer data from one environment to another, and transfer communication sessions from one environment to another, to name but a few.

Replicating portions of one environment in another environment may involve such things as replicating a computing environment (e.g., desktop, applications, application preferences, documents), web browser environment (e.g., bookmarks and history), and phone environment (e.g., speed-dial buttons), to name but a few.

Copying data from one environment to another may involve such things as copying an application program, document, memory image, personal phone book, or personal agenda, to name but a few. Copying typically creates multiple instances of the thing copied, and therefore typically necessitates a mechanism for synchronizing the multiple instances so that changes to one instance is reflected in other instances.

Transferring data from one environment to another may involve such things as transferring an application program, document, memory image, personal phone book, or personal agenda, to name but a few. Unlike copying, transferring typically removes the original so that there is only one instance of the thing transferred.

Transferring communication sessions from one environment to another may involve such things as transferring a computer session to a computer in the PAN, transferring a telephone session to a telephone in the PAN, or transferring a digital audio/video stream to a device in the PAN, to name but a few. In order to transfer a communication session to a PAN, the DAG may perform signaling necessary to pause or suspend the communication session, re-route the communication session to the PAN, and resume the communication system in the PAN. For example, Internet Protocol (IP) sessions for computer, telephone, and streaming sessions may require routing changes in the communication network in order to re-route the sessions to the PAN.

In one exemplary embodiment of a portable environment, the control logic 220 may replicate some or all of a user's work environment in a PAN 330 (e.g., the user's home or hotel room) and transfer active communication sessions (e.g., telephone and computer communication sessions) so that the user can continue working and communicating without interruption. This may involve such things as replicating a computing environment (e.g., desktop, applications, documents), re-routing computer communication sessions (e.g., active connections, multicast group memberships), and transferring telephone communication sessions (e.g., transferring POTS, wireless, or IP telephony sessions), to name but a few.

Figure 6:
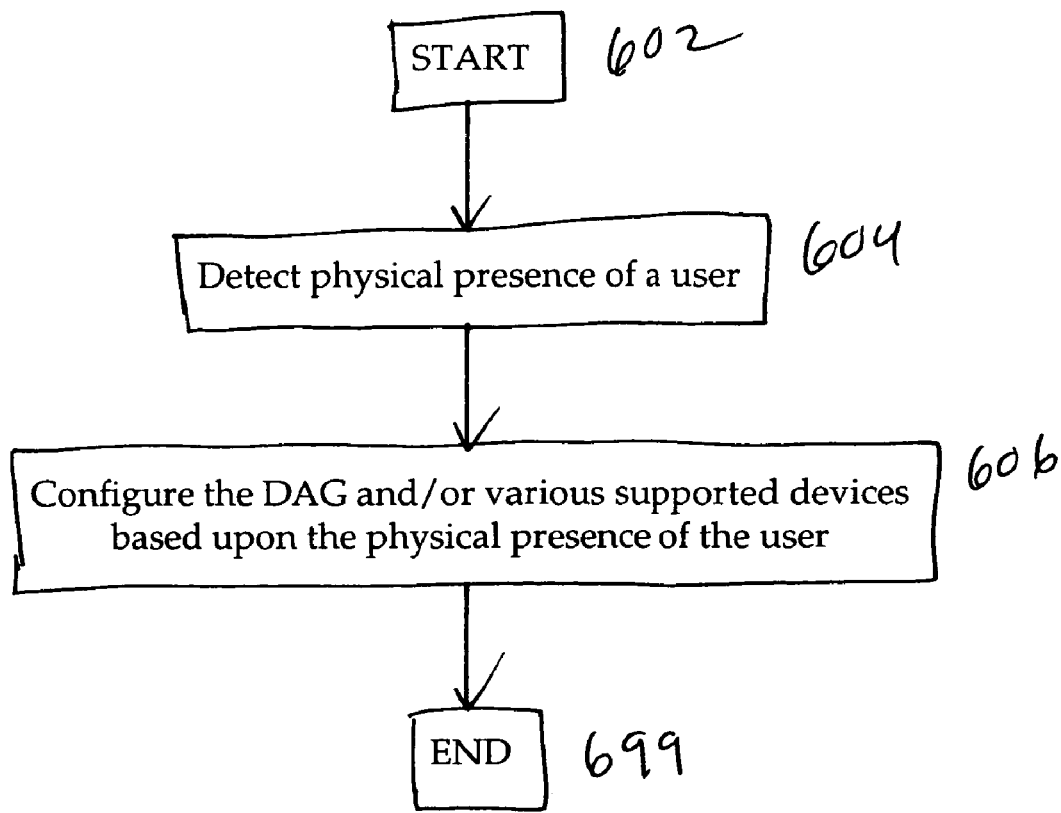
FIG. 6 is a logic flow diagram showing exemplary logic for configuring the DAG and/or various supported devices based upon the physical presence of a user in accordance with an embodiment of the present invention.

In one exemplary embodiment, the DAG 120 configures the DAG 120 and/or various supported devices based upon the physical presence of a user. FIG. 6 is a logic flow diagram showing exemplary logic 600 for configuring the DAG 120 and/or various supported devices based upon the physical presence of a user. Beginning at block 602, the logic detects physical presence of a user, in block 604, and configures the DAG 120 and/or various supported devices based upon the physical presence of the user, in block 606. The logic 600 terminates in block 699.

Figure 7:
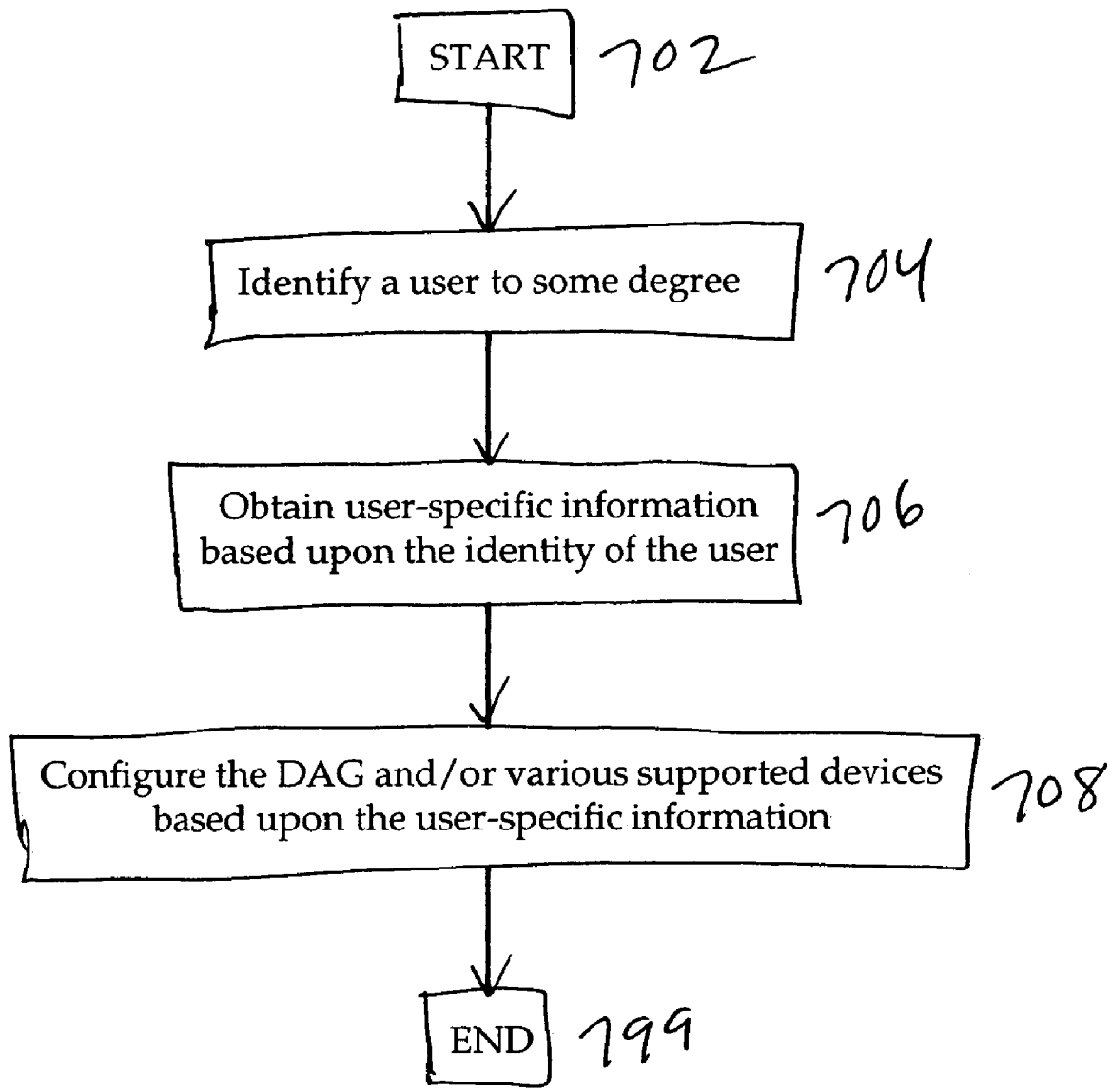
FIG. 7 is a logic flow diagram showing exemplary logic for configuring the DAG and/or various supported devices based upon user-specific information for an identified user in accordance with an embodiment of the present invention.

In another exemplary embodiment, the DAG 120 configures the DAG 120 and/or various supported devices based upon user-specific information for an identified user. FIG. 7 is a logic flow diagram showing exemplary logic 700 for configuring the DAG 120 and/or various supported devices based upon user-specific information for an identified user. Beginning at block 702, the logic identifies a user to some degree, in block 704. The logic then obtains user-specific information based upon the identity of the user, in block 706, for example, from the local memory 240 or from a remote source. The logic then configures the DAG 120 and/or various supported devices based upon the user-specific information, in block 708. The logic 700 terminates in block 799.

Figure 8:
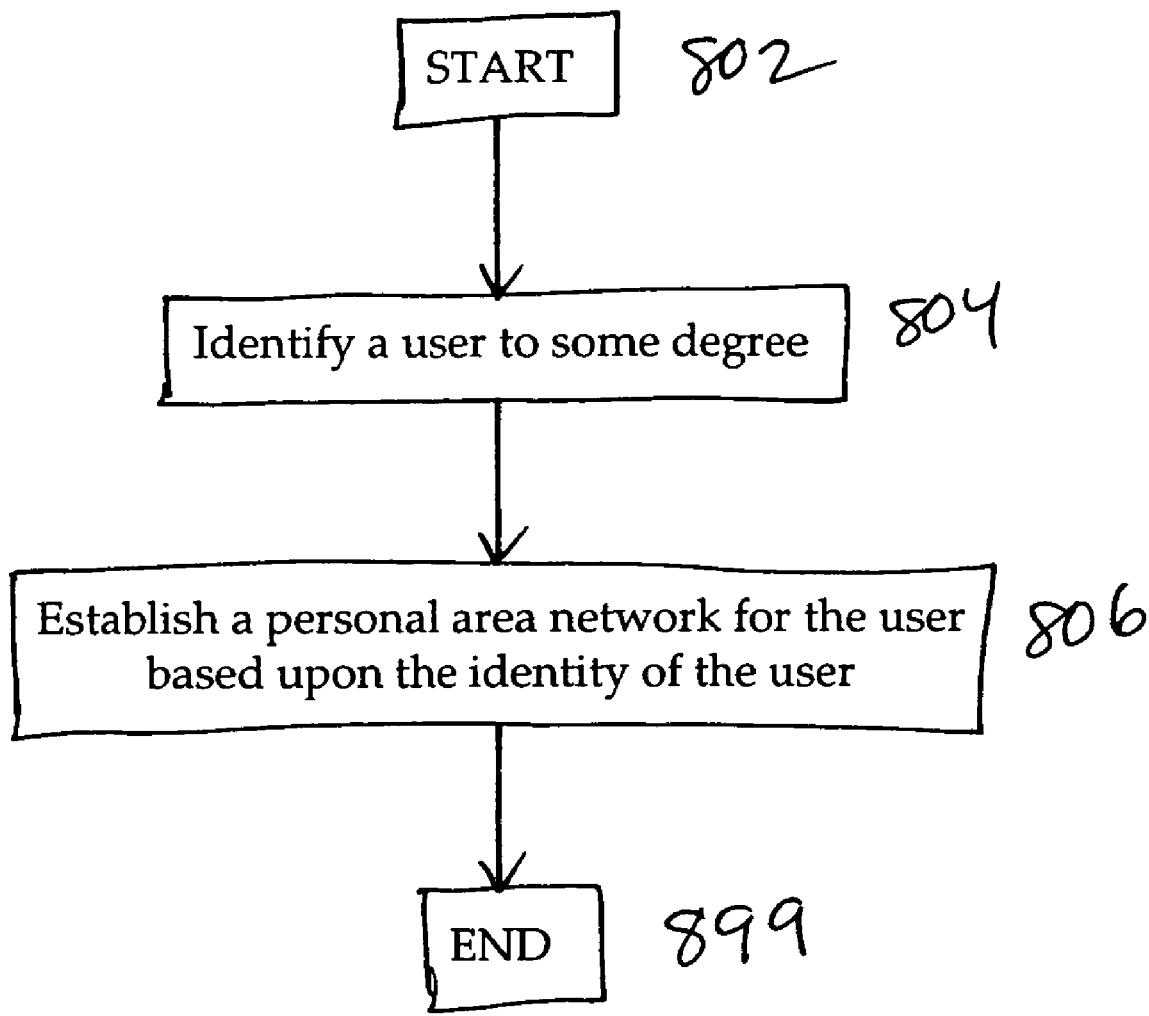
FIG. 8 is a logic flow diagram showing exemplary logic for establishing a personal area network for a user in accordance with an embodiment of the present invention.

In another embodiment of the invention, the DAG 120 establishes a personal area network for a user. FIG. 8 is a logic flow diagram showing exemplary logic 800 for establishing a personal area network for a user. Beginning at block 802, the logic identifier a user to some degree, in block 804. The logic then establishes a personal area network for the user based upon the identity of the user, in block 806. The logic 800 terminates in block 899.

Figure 9:
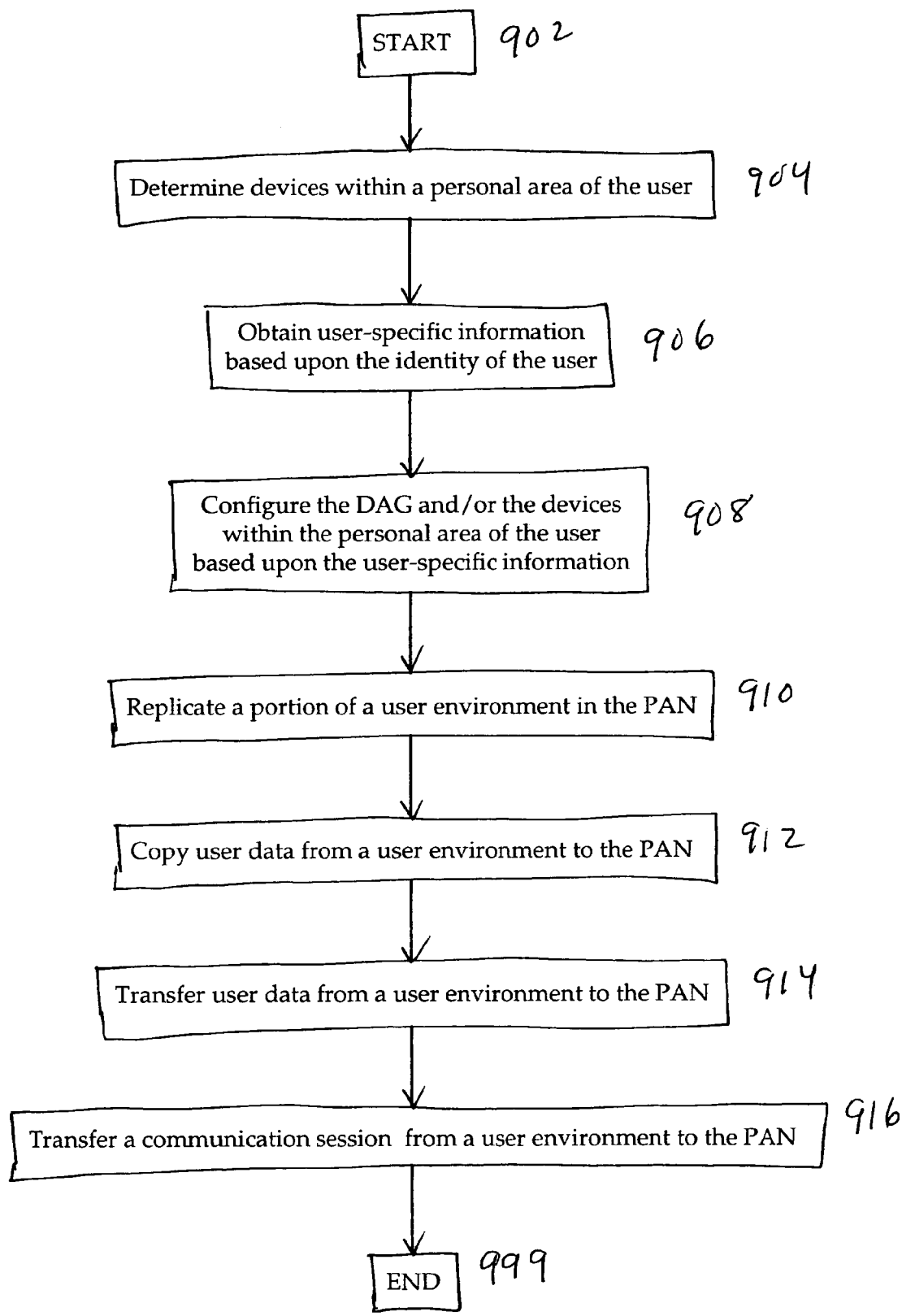
FIG. 9 is a logic flow diagram showing exemplary logic for establishing a personal area network for the user based upon the identity of the user in accordance with an embodiment of the present invention.

FIG. 9 is a logic flow diagram showing exemplary logic 900 for establishing a personal area network for the user based upon the identity of the user, for example, as in block 806 as shown in FIG. 8. Beginning at block 902, the logic determines the devices within a personal area of the user, in block 904. The logic then obtains user-specific information based upon the identity of the user, in block 906, for example, from the local memory 240 or from a remote source. The logic then configures the DAG 120 and/or the devices within the personal area of the user based upon the user-specific information, in block 908. The logic may replicate a portion of a user environment in the PAN, in block 910. The logic may copy data from a user environment to the PAN, in block 912. The logic may transfer data from a user environment to the PAN, in block 914. The logic may transfer a communication session from a user environment to the PAN, in block 916. The logic 900 terminates in block 999.

Figure 10:
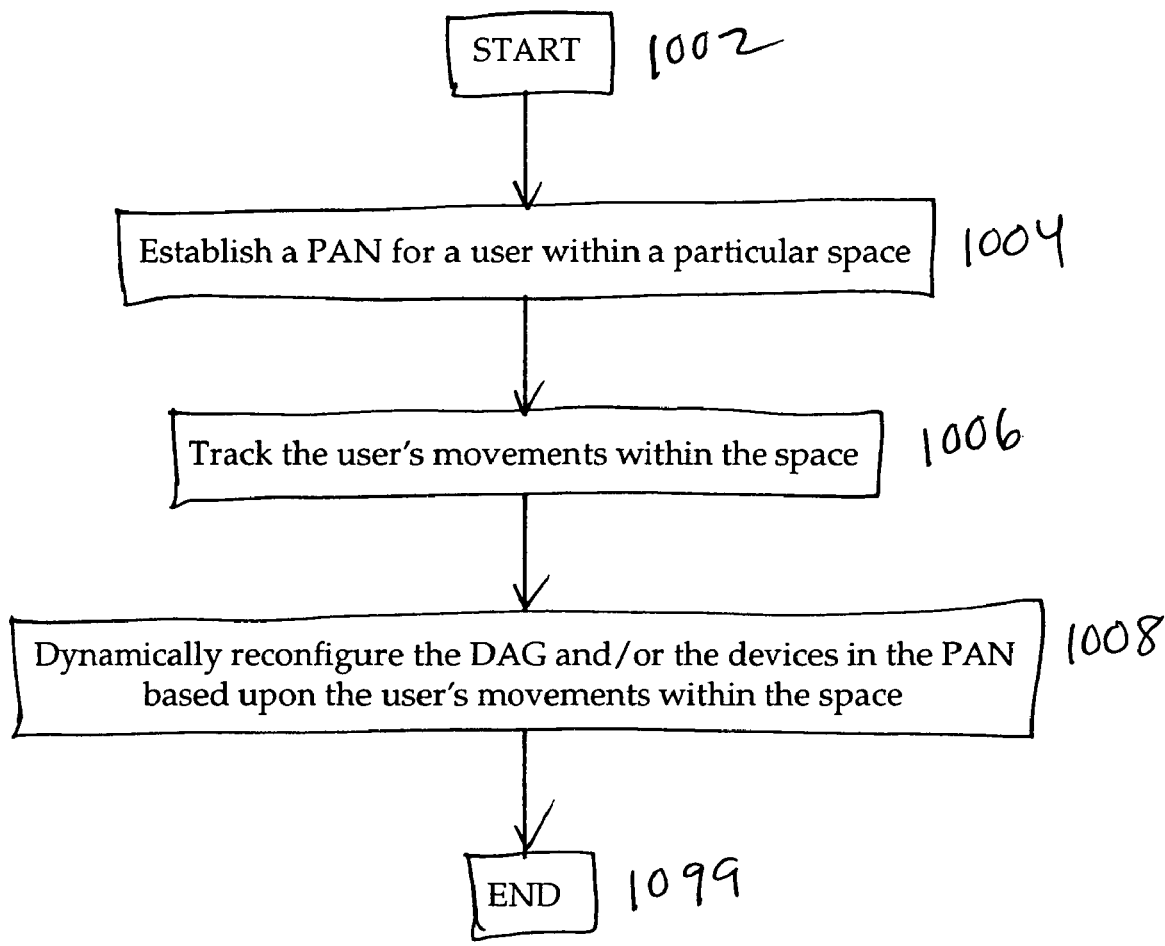
FIG. 10 is a logic flow diagram showing exemplary logic for dynamically reconfiguring the DAG and/or the devices in the PAN based upon the user's movements within a particular space in accordance with an embodiment of the present invention.

In another embodiment of the invention, the DAG 120 dynamically reconfigures the DAG 120 and/or the devices in the PAN based upon the user's movements within a particular space. FIG. 10 is a logic flow diagram showing exemplary logic 1000 for dynamically reconfiguring the DAG 120 and/or the devices in the PAN based upon the user's movements within a particular space. Beginning at block 1002, the logic establishes a PAN for a user within a particular space, in block 1004. The logic tracks the user's movements within the space, in block 1006. The logic dynamically reconfigures the DAG 120 and/or the devices in the PAN based upon the user's movements within the space, in block 1008. The logic 1000 terminates in block 1099.

Figure 11:
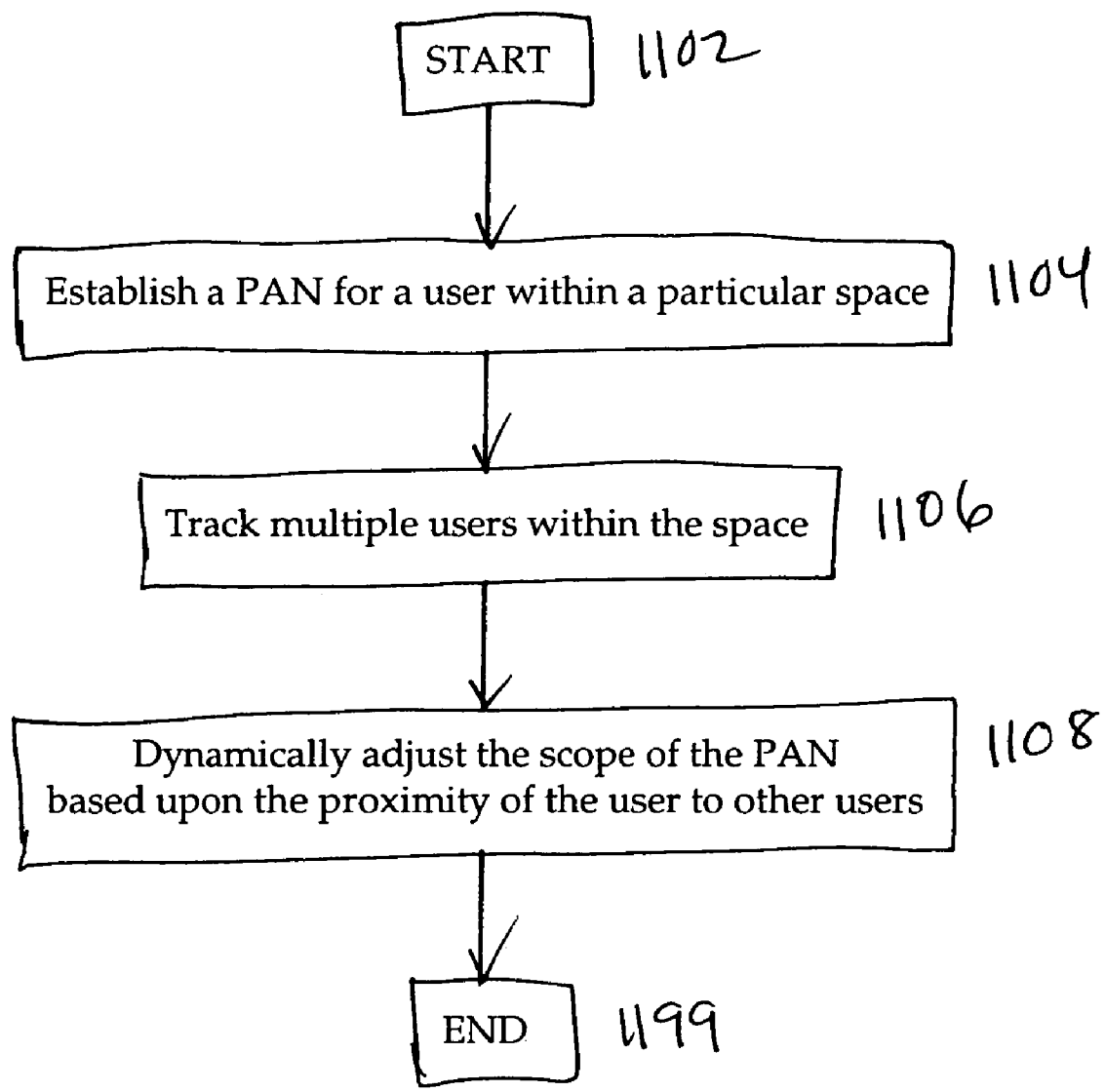
FIG. 11 is a logic flow diagram showing exemplary logic for dynamically adjusting the scope of the PAN based upon the proximity of a user to other users in accordance with an embodiment of the present invention.

In another embodiment of the invention, the DAG 120 dynamically adjusts the scope of the PAN based upon the proximity of a user to other users. FIG. 11 is a logic flow diagram showing exemplary logic 1100 for dynamically adjusting the scope of the PAN based upon the proximity of a user to other users. Beginning at block 1102, the logic establishes a PAN for a user within a particular space, in block 1104. The logic tracks multiple users within the space, in block 1106. The logic dynamically adjusts the scope of the PAN based upon the proximity of the user to other users within the space, in block 1108. The logic 1100 terminates in block 1199.

Figure 12:
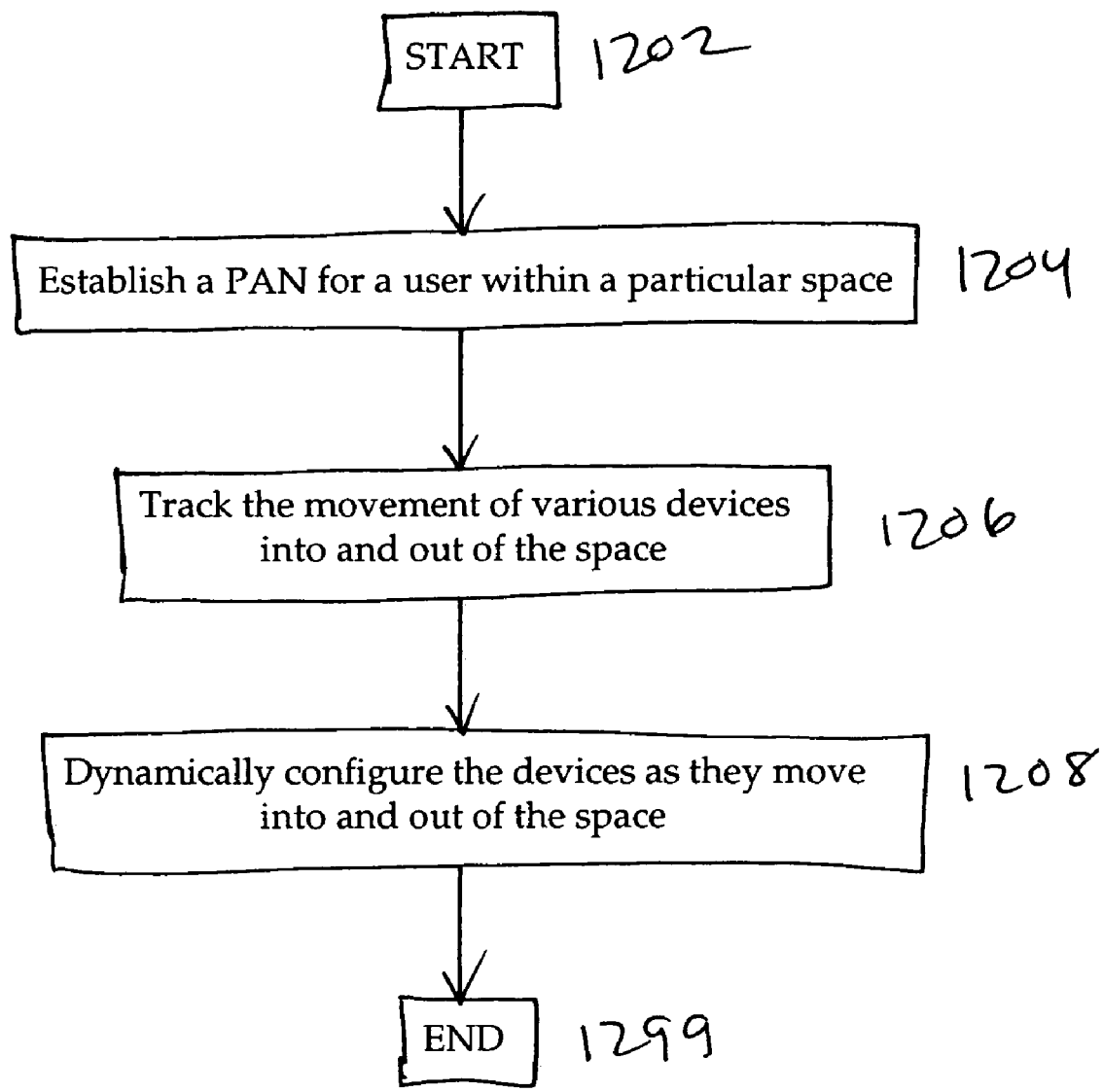
FIG. 12 is a logic flow diagram showing exemplary logic for dynamically reconfiguring devices as they move into and out of the PAN in accordance with an embodiment of the present invention.

In another embodiment of the invention, the DAG 120 dynamically reconfigures devices as they move into and out of the PAN. FIG. 12 is a logic flow diagram showing exemplary logic 1200 for dynamically reconfiguring devices as they move into and out of the PAN. Beginning at block 1202, the logic establishes a PAN for a user within a particular space, in block 1204. The logic tracks the movement of various devices into and out of the space, in block 1206. The logic dynamically reconfigures the devices as they move into and out of the space, in block 1208. The logic 1200 terminates in block 1299.

Figure 13:
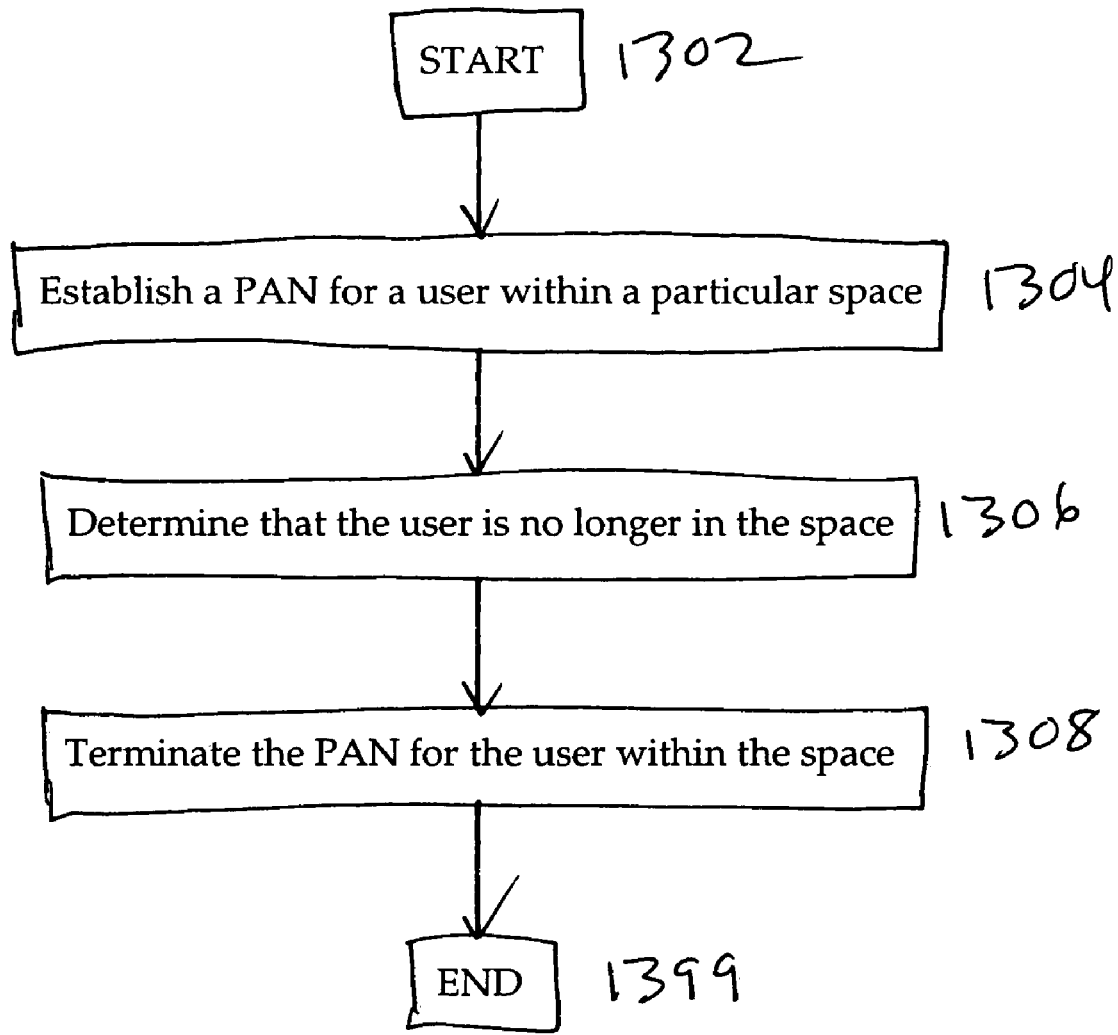
FIG. 13 is a logic flow diagram showing exemplary logic for terminating the PAN when the user leaves the PAN in accordance with an embodiment of the present invention.

In another embodiment of the invention, the DAG 120 terminates the PAN when the user leaves the PAN. FIG. 13 is a logic flow diagram showing exemplary logic 1300 for terminating the PAN when the user leaves the PAN. Beginning at block 1302, the logic establishes a PAN for a user within a particular space, in block 1304. Upon determining that the user is no longer in the space, in block 1306, the logic terminates the PAN for the user within the space, in block 1308. The logic 1300 terminates in block 1399.

Figure 14:
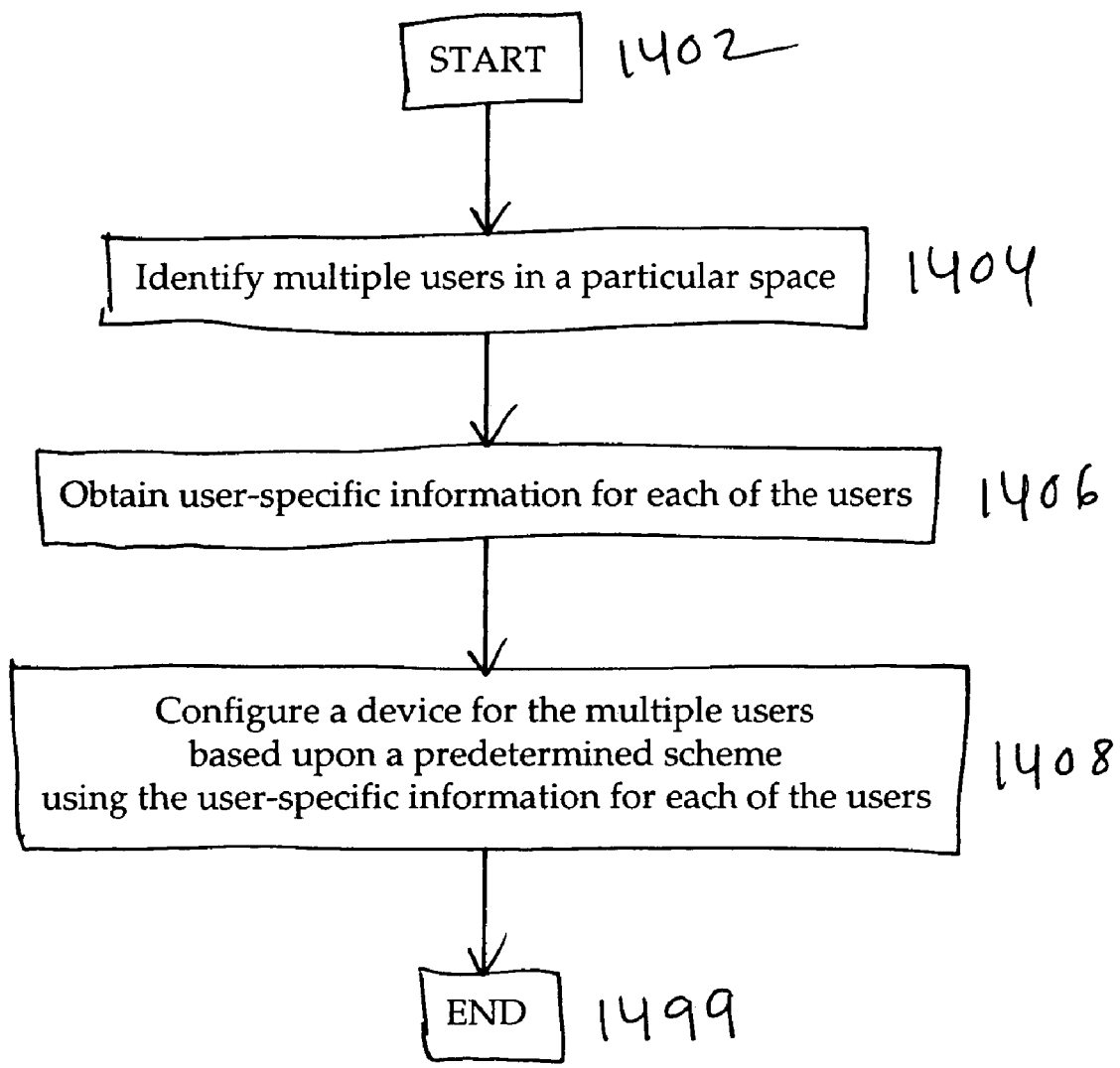
FIG. 14 is a logic flow diagram showing exemplary logic for configuring a device for multiple users in accordance with an embodiment of the present invention.

In another embodiment of the invention, the DAG 120 configures a device for multiple users. FIG. 14 is a logic flow diagram showing exemplary logic 1400 for configuring a device for multiple users. Beginning at block 1402, the logic identifies multiple users in a particular space, in block 1404. The logic obtains user-specific information for each of the users, in block 1406, for example, from the local memory 240 or from a remote source. The logic then configures a device for the multiple users based upon a predetermined scheme using the user-specific information for each of the users, in block 1408. The logic 1400 terminates in block 1499.

As part of establishing and maintaining a PAN, the DAG 120 may be called upon to manage an unknown device. Upon detecting an unknown device, the DAG 120 attempts to establish communication with the unknown device, for example, by trying different signaling mechanisms and protocols. Upon establishing communication with the unknown device, the DAG 120 determines the management capabilities of the unknown device, for example, by obtaining configuration/control information from the unknown device. Upon determining the management capabilities of the unknown device, the DAG 120 configures the unknown device for a user.

Figure 15:
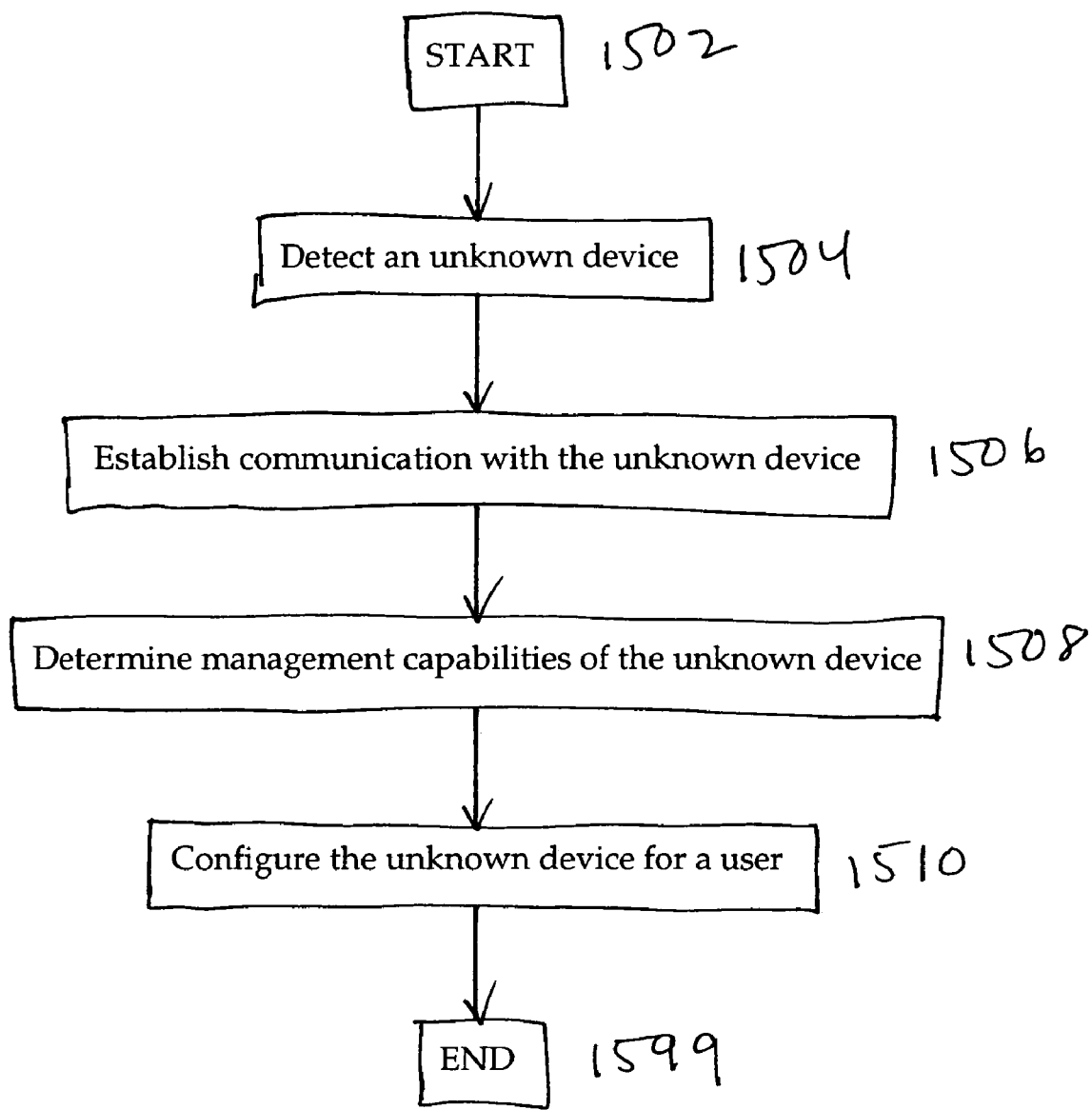
FIG. 15 is a logic flow diagram showing exemplary logic 1500 for managing an unknown device in accordance with an embodiment of the present invention.

FIG. 15 is a logic flow diagram showing exemplary logic 1500 for managing an unknown device. Beginning at block 1502, and upon detecting an unknown device, in block 1504, the logic establishes communication with the unknown device, in block 1506. The logic then determines management capabilities of the unknown device, in block 1508. The logic then configures the unknown device for a user, in block 1510. The logic 1500 terminates in block 1599.

Figure 16:
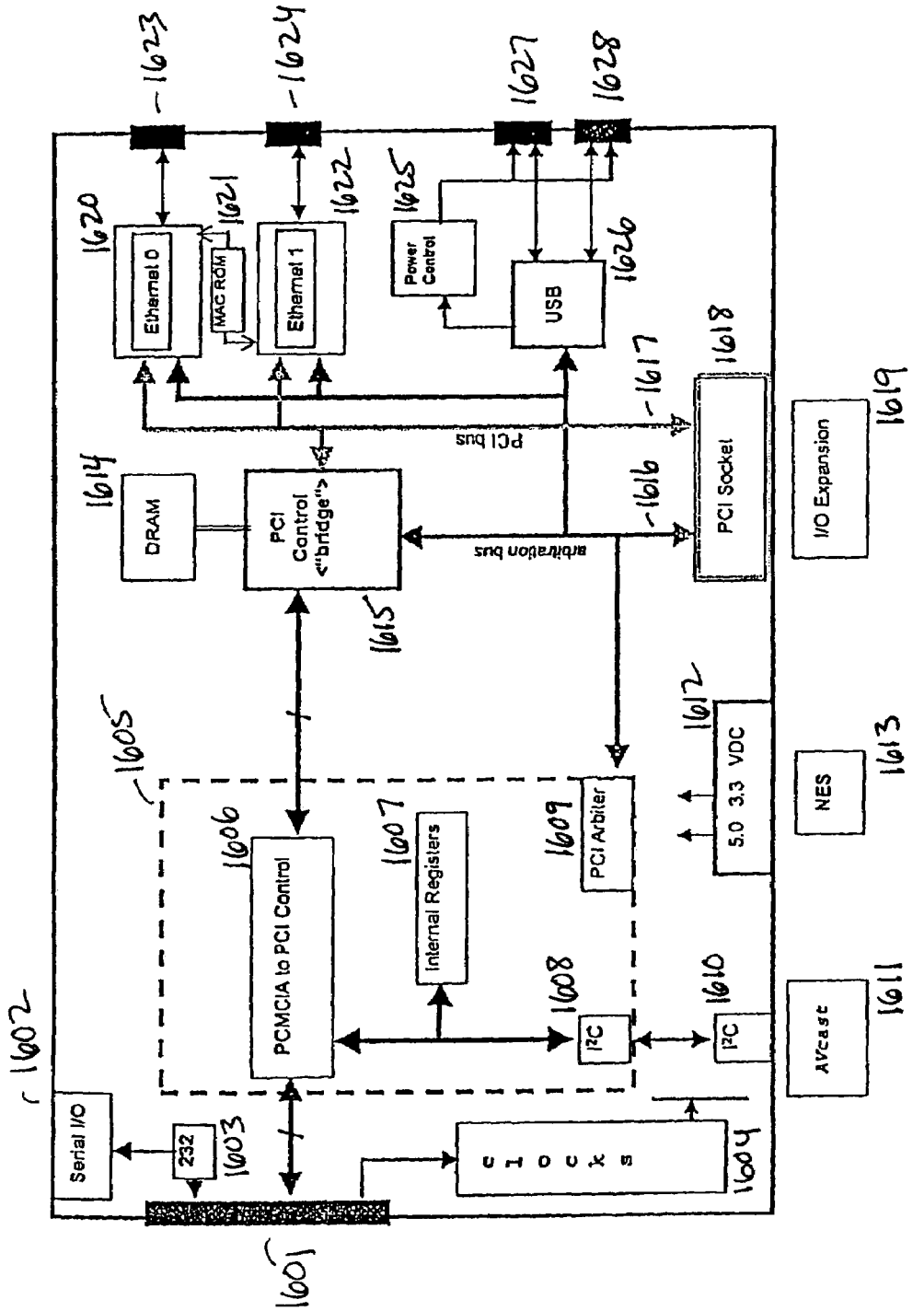
FIG. 16 is a schematic block diagram showing interface and control logic of an exemplary DAG in accordance with an embodiment of the present invention.

The DAG 120 typically supports many different types of communication interfaces for communicating with many different types of devices. FIG. 16 shows various interfaces and associated control logic of an exemplary DAG 120. Among other things, the DAG 120 includes a PCMCIA interface 1601, a Serial I/O interface 1602 with associated RS-232 logic 1603, an I²C interface 1610, Ethernet interfaces 1623 and 1624 with associated Ethernet logic 1620 and 1622 and MAC ROM 1621, USB interfaces 1627 and 1628 with associated USB logic 1626 and power control 1625, a PCI socket 1618, and power interfaces 1612. The PCMCIA interface 1601 provides clocks 1604 for the DAG, and is coupled to certain on-board peripherals including the RS-232 logic 1603 for the Serial I/O interface 1602. The Ethernet logic 1620 and 1622, the USB logic 1626, and the PCI socket 1618 are all on-board PCI peripherals that are coupled through a PCI arbitration bus 1616 and a PCI bus 1617. PCI control bridge 1615 (and its associated DRAM 1614) is also coupled to the PCI arbitration bus 1616 and the PCI bus 1617 for coordinating communication between the on-board PCI peripherals.

In order to enable communication between the PCMCIA peripherals, the PCI peripherals, and I²C peripherals, the DAG 120 includes a converter device 1605 that is coupled to the PCMCIA interface 1601, the PCI control bridge 1615, the PCI arbitration bus 1616, and the I2C interface 1610. The converter device 1605 is typically a FPGA with associated programmed logic, although the converter device 1605 could be some other type of device such as an ASIC. The converter device 1605 includes, among other things, PCMCIA to PCI control logic 1606 and PCI Arbiter logic 1609 for enabling communication between the PCMCIA on-board peripherals (e.g., the PCMCIA interface 1601 and the RS-232 logic 1603) and the PCI on-board peripherals (e.g., the Ethernet logic 1620 and 1622, the USB logic 1626, and the PCI socket 1618), specifically by converting between PCMCIA and PCI signaling formats, as described in the related patent application entitled METHOD AND APPARATUS FOR BRIDGING INCOMPATIBLE COMPUTER BUSES (Ser. No. 09/707,281). The converter device 1605 also includes I²C driver logic 1608 for driving the I²C interface 1610. The PCMCIA to PCI control logic 1606 and the I²C driver logic 1608 are coupled to each other and to a set of internal registers 1607.

Various external support devices allow the DAG 120 to enhance usability in many disparate environments. Examples include a powerline-control-based network (not shown) and a multimedia broadband display system (AVcast) 1611 coupled through the I²C interface 1610, a Network Energy Source (NES) 1613 coupled to the power interfaces 1612 for providing resilient power, (e.g., via an IEEE 802.3af compliant power connection), various PCI-compliant devices coupled through the PCI socket 1618, various USB-compliant devices coupled through the USB interfaces 1627 and 1628, various Ethernet devices coupled through the Ethernet interfaces 1623 and 1624, various serial communication devices coupled through the Serial I/O interface 1602, and various PCMCIA-compliant devices coupled through the PCMCIA interface 1601.

In an embodiment of the present invention, the DAG 120 provides various personalized services to the user. These personalized services are generally high-level applications for automating certain tasks that otherwise would be performed manually by the user. These personalized services expand upon, or are in addition to, configuring a device or establishing a PAN based upon the physical presence of the user and/or the identity of the user. Furthermore, these personalized services typically build upon the various lower-level capabilities of the DAG 120 (e.g., user detection/identification capabilities, communication capabilities, device management capabilities, and personal area networking capabilities, to name but a few). In essence, then, the DAG 120 may act as a personal assistant or butler for the user.

Thus, within the DAG 120, the control logic 220 includes logic for providing personalized services to the user. The control logic 220 operates automatically, dynamically, and transparently in order to provide the various personalized services to the user.

In order to provide such personalized services, the control logic 220 must first detect physical presence of the user and identify the user to some degree. Thus, the DAG 120 includes a mechanism for detecting and identifying the user. The mechanism for detecting and identifying the user can utilize any user detection/identification techniques including, but in no way limited to, various biometric, behavioral, and interactive techniques. Examples include, among other things, physical presence detection (e.g., body heat detection, motion detection, proximity detection via such things as radar, sonar, and changes in electric field), a personal identification number entered through a key pad, an access card swiped through a card reader, voice recognition, fingerprint identification, retinal scanning, DNA analysis, visual identification, handwriting analysis, and physical characteristics (e.g., height, weight, infrared signature, electromagnetic signature), among other things. Thus, the DAG 120 may include or be coupled to a physical presence detector, a detector for detecting the user, such as a keypad for obtaining a personal identification number, a card reader for reading an access card, a voice recognizer for voice recognition, a fingerprint reader for fingerprint identification, a retinal scanner for retinal scanning, a DNA analyzer for DNA analysis, a camera for visual identification, a handwriting reader for handwriting analysis, a scale for measuring weight, an infrared sensor for reading an infrared signature, an electromagnetic sensor for reading an electromagnetic signature, or other detector. The detector may be integral with or external to the DAG 120. External detectors may be intelligent devices that include logic for identifying users or unintelligent devices that feed raw information to the control logic 220 for enabling the control logic 220 to identify the users.

FIG. 4 shows an exemplary DAG 120 including an integral detector 450 for detecting the physical presence of a user. The detector 450 feeds user-identifying information to the control logic 220. The control logic 220 uses the user-identifying information to identify the user to some degree.

FIG. 5 shows an exemplary DAG 120 coupled to an external detector 560 for detecting the physical presence of a user. The DAG 120 includes a detector interface 550 for coupling to the detector 560. The detector 560 feeds user-identifying information to the control logic 220 via the detector interface 550. The control logic 220 uses the user-identifying information to identify the user to some degree.

Once the control logic 220 has detected the physical presence of the user and identified the user to some degree, the control logic 220 obtains user-specific information based upon the physical presence of the user and/or the identity of the user. The user-specific information may include such things as per-user rules (i.e., rules set by the network administrator, such as access control rules, quality/type of service constraints, and bandwidth allocation), user-defined rules (e.g., rules set by one or more of the users, such as parental control rules), user preferences, user-specific applications, and device configuration profiles. The user-specific information may be stored locally in the DAG 120 (e.g., in the local memory 240), in any of the supported devices 130, and/or within the communication network 110. Thus, the control logic 220 may retrieve the information from a local storage (e.g., local memory 240) and/or a remote storage (e.g., in a device 130 or the communication network 110).

After retrieving the user-specific information, the control logic 220 may configure supported devices and/or establish a PAN for the user based upon the user-specific information. In any case, the control logic 220 configures the DAG 120 based upon the user-specific information and provides personalized services to the user based upon the user-specific information.

The control logic 220 may provide many different types of personalized services. Providing personalized services to the user may involve such things as obtaining information for the user, anticipating the needs of the user and taking appropriate actions, updating preference information, simplifying device control, handling the user's schedule, and providing reminders to the user, to name but a few. The control logic 220 typically includes logic for providing various personalized services as well as logic that is ancillary to providing such personalized services, such as timer logic, device management logic (e.g., for monitoring, configuring, and controlling supported devices), scheduling logic, information retrieval logic (e.g., retrieving information over the communication network 110), and information storage logic, to name but a few. The control logic 220 typically maintains a context for each personalized service, where each context includes the logic for providing the personalized service and various data constructs (e.g., memory, data structures, state machines, timers) used by the logic for providing the personalized service.

Obtaining information for the user may involve such things as obtaining sports scores for the user's favorite teams, obtaining information for the user's investments (e.g., stock prices, mutual fund prices, performance indices, important company information), and obtaining news, to name but a few. For example, a traveler may check into a hotel room and automatically receive hometown sports/news as well as a synopsis of the day's activities relating to the user's investments, all of which the DAG may obtain automatically based upon user preferences and other information (e.g., the DAG may determine a source for hometown sports/news based upon the user's home address).

Anticipating the needs of the user and taking appropriate actions may involve such things as having coffee ready when the user comes downstairs in the morning, turning on the heat while the user is in the shower so that the user is not chilled upon leaving the shower, locating the user's belongings (e.g., keys, wallet, shoes) so that the user does not have to scurry to find them when leaving for work, starting the user's car remotely so it is warmed up when needed, monitoring supplies (e.g., inventory and expiration dates of food, pet supplies, toiletries, cleaning products) and automatically ordering necessary supplies (e.g., electronically via an on-line grocer), having a snack ready when the user comes home from work in the evening, and turning on an electric blanket before the user goes to sleep, to name but a few.

Updating preference information may involve such things as monitoring usage of devices by the user, determining user preferences for a device based upon usage of the device (e.g., determining that the user prefers one television news program over another television news program), inferring user preferences for one device based upon usage of another device (e.g., inferring that the user prefers the television to be loud because the user listens to the stereo loud), and storing revised preference information, to name but a few. The preference information may be stored locally and/or on a remote device, and therefore the DAG may store revised preference information in a local storage or remote device.

Simplifying device control may involve such things as providing a standardized control interface for disparately-controlled devices, coordinating the operation of multiple devices, and performing user-requested functions, to name but a few. For example, the DAG may provide a graphical user interface (GUI) for controlling different types of devices, ensure that the operations of various devices do not conflict (e.g., ensure that the heat and air conditioning are not on simultaneously), and translate a user request into appropriate signals for controlling the appropriate devices (e.g., a command to make breakfast may result in the DAG controlling a coffee maker, juicer, bread maker, and egg poacher), to name but a few.

Handling the user's schedule may involve such things as maintaining a calendar for the user, scheduling appointments for the user, managing inter-user scheduling dependencies, and scheduling necessary items for an appointment, to name but a few. For example, in order to schedule a meeting, the DAG may determine all users that need to attend the meeting, check each user's calendar to determine if there is a scheduling conflict, schedule the meeting and update each user's calendar, reserve a meeting room, order equipment for the meeting (e.g., overhead projector), and order food for the meeting (perhaps taking into account each user's preferred food), to name but a few. The DAG may coordinate personal and work appointments, so that, for example, a work-related meeting may be conflicted out by the family picnic. The DAG may account for commute times and other delays when making scheduling decisions, so that, for example, the DAG will not schedule meetings an hour apart when it will take two hours to travel between meetings.

Providing reminders to the user may involve such things as waking the user at a predetermined time (i.e., wake-up call or alarm), reminding the user of certain events (e.g., meetings, appointments, television shows, childrens' activities, birthdays, anniversaries), and times to take medicines, to name but a few. The DAG may keep track of the schedules and activities of multiple users and generate appropriate reminders for each user within each user's PAN. For example, the DAG may generate a wake-up call in the living room for a user who fell asleep on the sofa, inform the user who is busily cleaning that dinner has finished cooking, and remind the user to take wet clothes out of the washing machine, to name but a few.

Figure 17:
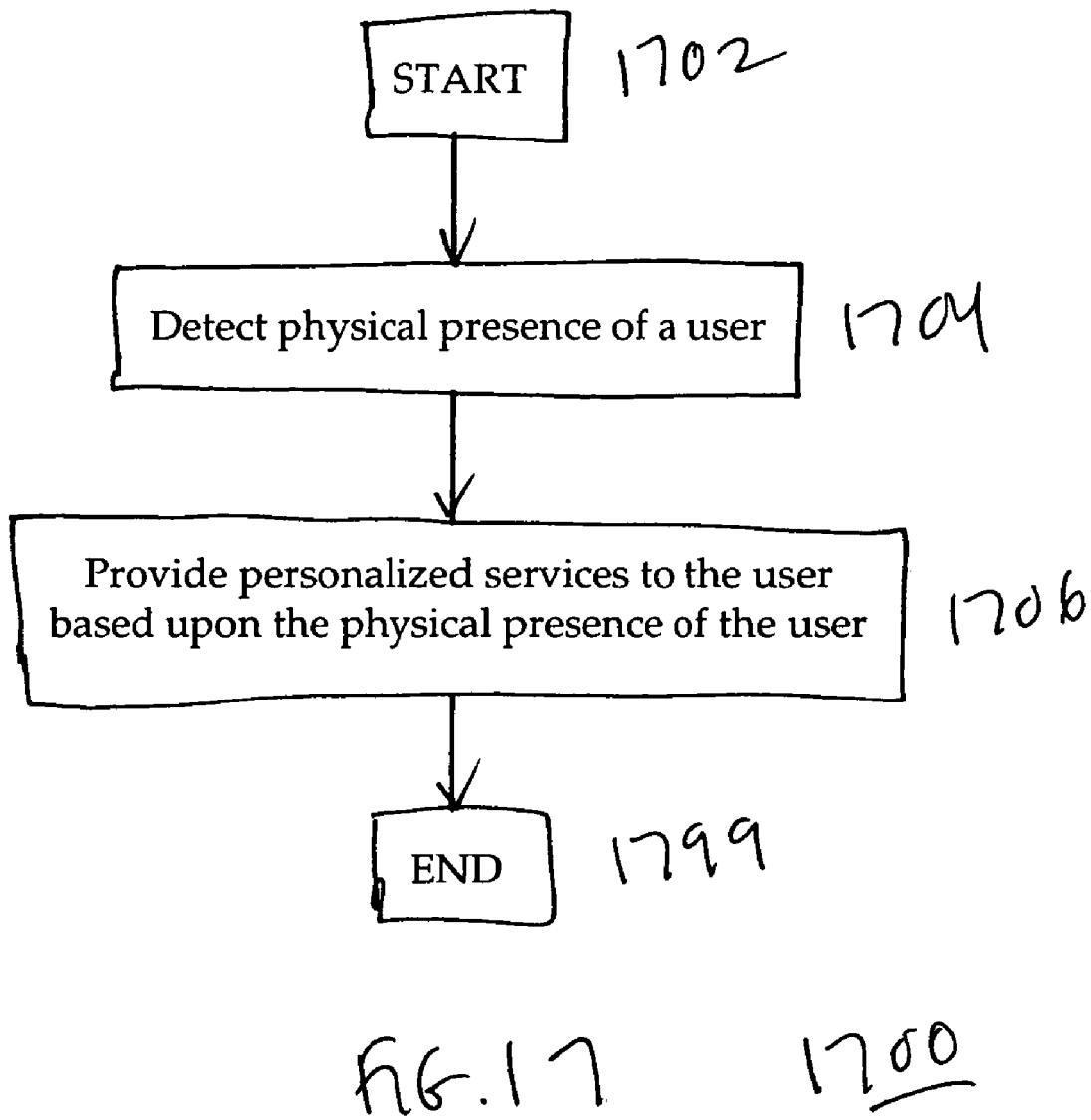
FIG. 17 is a logic flow diagram showing exemplary logic 1700 for providing personalized services to the user based upon the physical presence of the user in accordance with an embodiment of the present invention.

In one exemplary embodiment, the DAG 120 provides personalized services to the user based upon the physical presence of the user. FIG. 17 is a logic flow diagram showing exemplary logic 1700 for providing personalized services to the user based upon the physical presence of the user. Beginning at block 1702, the logic detects physical presence of the user, in block 1704, and provides personalized services to the user based upon the physical presence of the user, in block 1706. The logic 1700 terminates in block 1799.

Figure 18:
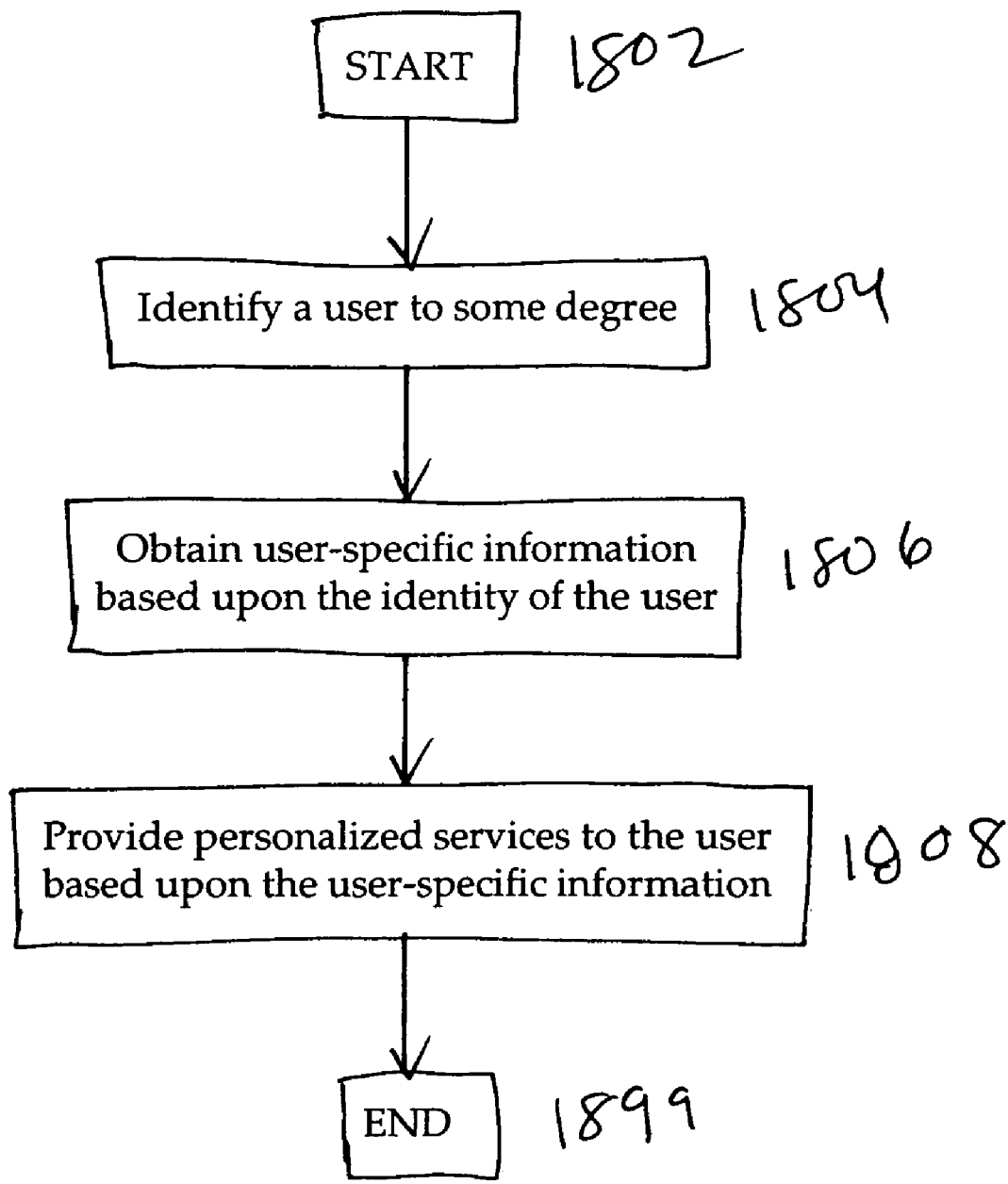
FIG. 18 is a logic flow diagram showing exemplary logic 1800 for providing personalized services to the user based upon the identity of the user in accordance with an embodiment of the present invention.

In another exemplary embodiment, the DAG 120 provides personalized services to the user based upon the identity of the user. FIG. 18 is a logic flow diagram showing exemplary logic 1800 for providing personalized services to the user based upon the identity of the user. Beginning at block 1802, the logic identifies the user to some degree, in block 1804. The logic then obtains user-specific information based upon the identity of the user, in block 1806, for example, from the local memory 240 or from a remote source. The logic then provides personalized services to the user based upon the user-specific information, in block 1808. The logic 1800 terminates in block 1899.

Various embodiments are described herein by example. The present invention is in no way limited to any of the embodiments that are described herein by example. Thus, for example, the DAG 120 is not limited to any particular type of network interface or communication network, to any particular device interfaces, to configuration of any particular devices, to any particular communication protocols, to any particular router implementation, to any particular gateway implementation, or to any particular set of provided services. With respect to establishing a PAN, the DAG 120 is not limited to any particular mechanism for detecting physical presence of a user, to any particular mechanism for identifying a user, to any particular technique for obtaining user-specific information, to any particular type of user-specific information, to any particular PAN environment, to any particular PAN scope, to any particular PAN devices, to any particular PAN context, to any particular technique for determining supported devices within the PAN, to any particular technique for configuring the supported devices within the PAN, or to any particular technique for dynamically modifying the PAN. With respect to configuring an unknown device, the DAG 120 is not limited to any particular technique for establishing communication with the unknown device, to any particular technique for determining management capabilities of the unknown device, or to any particular technique for configuring the unknown device. With respect to providing personalized services to the user, the DAG 120 is not limited to any particular types of personalized services or to any means for providing the personalized services.

It should be noted that the terms such as "router," "gateway," and "switch" is used herein to describe various types of communication devices that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the control logic 220 is implemented as a set of computer program instructions that is converted into a computer executable form, stored as such in a computer readable medium, and executed by a microprocessor within the DAG 120 under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be distributed in any form as a removable storage medium with accompanying printed or electronic documentation (e.g., shrink wrapped software), or preloaded with a computer system (e.g., on system ROM or fixed disk).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), or preloaded with a computer system (e.g., on system ROM or fixed disk).

The present invention may be embodied in other specific forms without departing from the true scope of the invention. The described embodiments are to be considered in all respects only as illustrative and not restrictive.

What is claimed is:

1. A method for providing a personalized service in a communication system, the method comprising:
   detecting physical presence of a user and identifying the user by a data appliance gateway, wherein the detecting includes a determination, based on automatic detection of at least one physical attribute of the user's body directly from the user's body, that the user is currently in close physical proximity to the communication system;
   identifying a plurality of devices that are within a personal area of the user;
   creating, responsive to the detection of the physical presence of the user and the identification of the plurality of devices, a personal area network for the user including the plurality of devices identified within the personal area of the user, wherein the personal area network is created and managed by the data appliance gateway and the creating further comprises:
      obtaining user-specific information based upon the identity of the user;
      configuring features of the identified devices within the personal area network based upon the obtained user-specific information; and
   using the data appliance gateway to provide the personalized service to the user within the personal area network based upon the physical presence of the user and the obtained user-specific information.

2. The method of claim 1, wherein detecting the physical presence of the user comprises:
   using a detector to detect the physical presence of the user.

3. The method of claim 1, wherein detecting the physical presence of the user comprises:
   using a detector in combination with the appliance gateway to detect the physical presence of the user.

4. The method of claim 1, wherein detecting physical presence of the user comprises:
   identifying the user.

5. The method of claim 4, wherein providing the personalized service to the user based upon the physical presence of the user comprises:
   providing the personalized service to the user based upon the identity of the user.

6. The method of claim 5, wherein providing the personalized service to the user based upon the identity of the user comprises at least one of:
   obtaining information for the user;
   anticipating needs of the user and providing said needs;
   updating user preference information;
   simplifying device control for the user;
   handling a user schedule; and
   providing reminders to the user.

7. The method of claim 1, wherein identifying the user comprises:
   identifying the user based upon biometric information.

8. The method of claim 1, wherein the user-specific information comprises at least one of:
  per-user rules;
  user-defined rules;
  user preferences; and
  user applications.

9. The method of claim 1, wherein obtaining user-specific information based upon the identity of the user comprises at least one of:
  retrieving the user-specific information from a local storage of an appliance gateway;
  retrieving the user-specific information from the device;
  retrieving the user-specific information from another device; and retrieving the user-specific information from a remote storage over a communication network.

10. The method of claim 1, wherein obtaining user-specific information based upon the identity of the user comprises:
  logically inferring some user-specific information from other user-specific information.

11. The method of claim 1, wherein providing the personalized service to the user within the personal area network comprises:
  providing information to the user within the personal area network.

12. The method of claim 1, wherein providing the personalized service to the user within the personal area network comprises:
  monitoring a supported device within the personal area network.

13. The method of claim 1, wherein providing the personalized service to the user within the personal area network comprises:
  monitoring the user within the personal area network.

14. The method of claim 1, wherein providing the personalized service to the user within the personal area network comprises:
  maintaining a schedule for the user; and
  providing a reminder to the user within the personal area network.

15. The method of claim 1 wherein providing the personalized service to the user within the personal area network comprises:
  retrieving information for the user over a communication network.

16. The method of claim 1, wherein providing the personalized service to the user within the personal area network comprises:
  determining a user preference for a supported device.

17. The method of claim 16, wherein providing the personalized service to the user within the personal area network further comprises:
  updating user preference information to include the user preference for the supported device.

18. An apparatus comprising:
  a processor executing instructions stored in a memory, the instructions comprising:
  user detection logic operably coupled to detect physical presence of a user and identify the user, wherein the user detection logic detects that the user is currently in close physical proximity to the communication system based on automatic detection of at least one physical attribute of the user's body directly from the user's body;
  personal area network logic to identify a plurality of devices that are within a personal area of the user, create and manage, responsive to detection of the physical presence of the user and the identification of the plurality of devices within the personal area of the user, a personal area network for the user including the plurality of devices identified within the personal area of the user, obtain user-specific information based upon the identity of the user, and configure features of the identified devices within the personal area network based upon the obtained user-specific information; and
  personal agent logic responsive to the user detection logic and operably coupled to provide personalized services to the user within the personal area network based upon the physical presence of the user and the obtained user-specific information.

19. The apparatus of claim 18, wherein the user detection logic comprises a detector for detecting the physical presence of the user.

20. The apparatus of claim 18, wherein the user detection logic is coupled to a detector for detecting the physical presence of the user.

21. The apparatus of claim 18, wherein the user detection logic is operably coupled to identify the user based upon biometric information.

22. The apparatus of claim 18, wherein the personal agent logic is operably coupled to provide the personalized service to the user based upon the identity of the user.

23. The apparatus of claim 22, wherein the personal agent logic is operably coupled to obtain information for the user.

24. The apparatus of claim 22, wherein the personal agent logic is operably coupled to anticipate needs of the user.

25. The apparatus of claim 22, wherein the personal agent logic is operably coupled to update user preference information.

26. The apparatus of claim 22, wherein the personal agent logic is operably coupled to simplify device control for the user.

27. The apparatus of claim 22, wherein the personal agent logic is operably coupled to handle a user schedule.

28. The apparatus of claim 22, wherein the personal agent logic is operably coupled to provide reminders to the user.

29. The apparatus of claim 22, wherein the personal area network logic is operably coupled to create the personal area network for the user based upon the identity of the user.

30. The apparatus of claim 29, wherein the personal agent logic is operably coupled to provide information to the user within the personal area network.

31. The apparatus of claim 29, wherein the personal agent logic is operably coupled to monitor a supported device within the personal area network.

32. The apparatus of claim 29, wherein the personal agent logic is operably coupled to monitor the user within the personal area network.

33. The apparatus of claim 29, wherein the personal agent logic is operably coupled to maintain a schedule for the user and provide a reminder to the user within the personal area network.

34. The apparatus of claim 29, wherein the personal agent logic is operably coupled to retrieve information for the user over a communication network.

35. The apparatus of claim 29, wherein the personal agent logic is operably coupled to determine a user preference for a supported device.

36. The apparatus of claim 35, wherein the personal agent logic is operably coupled to update user preference information to include the user preference for the supported device.

37. The apparatus of claim 18, wherein the user-specific information comprises at least one of:
  per-user rules;
  user-defined rules;
  user preferences; and user applications.

38. The apparatus of claim 18, wherein the personal agent logic is operably coupled to retrieve the user-specific information from at least one of:
   a local storage;
   a supported device; and
   a remote storage over a communication network.

39. The apparatus of claim 18, wherein the personal agent logic is operably coupled to logically infer some user-specific information from other user-specific information.

40. A computer program product including a computer readable medium, the computer readable medium having a computer program stored thereon for controlling a computer system, the computer program comprising:
   user detection logic programmed to detect physical presence of a user and identify the user, wherein the user detection logic detects that the user is currently in close physical proximity to the computer system based on automatic detection of at least one physical attribute of the user's body directly from the user's body;
   personal area network logic to identify a plurality of devices that are within a personal area of the user, create and manage, responsive to detection of the physical presence of the user and the identification of the plurality of devices within the personal area of the user, a personal area network for the user including the plurality of devices identified within the personal area of the user, obtain user-specific information based upon the identity of the user, and configure features of the identified devices within the personal area network based upon the obtained user-specific information; and
   personal agent logic responsive to the user detection logic and programmed to provide personalized services to the user within the personal area network based upon the physical presence of the user and the obtained user-specific information.

41. The computer program product of claim 40, wherein the user detection logic comprises a detector for detecting the physical presence of the user.

42. The computer program product of claim 40, wherein the user detection logic is coupled to a detector for detecting the physical presence of the user.

43. The computer program product of claim 40, wherein the user detection logic is programmed to identify the user based upon
   biometric information.

44. The computer program product of claim 40, wherein the personal agent logic is programmed to provide the personalized service to the user based upon the identity of the user.

45. The computer program product of claim 44, wherein the personal agent logic is programmed to obtain user-specific information based upon the identity of the user and provide the personalized service to the user based upon the user-specific information.

46. The computer program product of claim 45, wherein the user-specific information comprises at least one of:
   per-user rules;
   user-defined rules;
   user preferences; and
   user applications.

47. The computer program product of claim 45, wherein the personal agent logic is programmed to retrieve the user-specific information from at least one of:
   a local storage;
   a supported device; and
   a remote storage over a communication network.

48. The computer program product of claim 45, wherein the personal agent logic is programmed to logically infer some user-specific information from other user-specific information.

49. The computer program product of claim 44, wherein the personal agent logic is programmed to obtain information for the user.

50. The computer program product of claim 44, wherein the personal agent logic is programmed to anticipate needs of the user and provide said needs.

51. The computer program product of claim 44, wherein the personal agent logic is programmed to update user preference information.

52. The computer program product of claim 44, wherein the personal agent logic is programmed to simplify device control for the user.

53. The computer program product of claim 44, wherein the personal agent logic is programmed to handle a user schedule.

54. The computer program product of claim 44, wherein the personal agent logic is programmed to provide reminders to the user.

55. The computer program product of claim 44, wherein the personal area network logic is programmed to establish the personal area network for the user based upon the identity of the user.

56. The computer program product of claim 55, wherein the personal agent logic is programmed to provide information to the user within the personal area network.

57. The computer program product of claim 55, wherein the personal agent logic is programmed to monitor a supported device within the personal area network.

58. The computer program product of claim 55, wherein the personal agent logic is programmed to monitor the user within the personal area network.

59. The computer program product of claim 55, wherein the personal agent logic is programmed to maintain a schedule for the user and provide a reminder to the user within the personal area network.

60. The computer program product of claim 55, wherein the personal agent logic is programmed to retrieve information for the user over a communication network.

61. The computer program product of claim 55, wherein the personal agent logic is programmed to determine a user preference for a supported device.

62. The computer program product of claim 61, wherein the personal agent logic is programmed to update user preference information to include the user preference for the supported device.

63. A system for providing personalized services, the system comprising
   a gateway operably coupled to
   detect physical presence of a user,
   identify the user,
   identify a plurality of devices within a personal area of the user,
   create a personal area network for the user including the plurality of devices identified within a personal area of the user responsive to the detection of the physical presence of the user and the identification of the plurality of devices,
   obtain user-specific information based upon the identity of the user,
   configure features of the identified devices within the personal area network based upon the obtained user-specific information, and to provide personalized services to the user within the personal area network based upon the physical presence of the user and the obtained user-specific information, wherein the gateway detects that the user is currently in close physical proximity to the gateway based on automatic detection of at least one physical attribute of the user's body directly from the user's body.

64. The system of claim 63, further comprising a physical presence detector in communication with the gateway for providing physical presence information to the gateway.

65. The system of claim 63, wherein the gateway is operably coupled to determine an identity of the user based upon the physical presence of the user and provide the personalized services to the user based upon the identity of the user.

66. The system of claim 63, wherein the gateway is operably coupled to obtain the user-specific information from at least one of:

a local storage of the computer system;

a supported device of the computer system; and a remote storage over a communication network.

* * * * *